US008982686B2

(12) United States Patent
Van Nee et al.

(10) Patent No.: US 8,982,686 B2
(45) Date of Patent: Mar. 17, 2015

(54) COMMUNICATION DEVICES FOR GENERATING AND USING A MATRIX-MAPPED SEQUENCE

(75) Inventors: Didier Johannes Richard Van Nee, De Meern (NL); Albert Van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 13/149,432

(22) Filed: May 31, 2011

(65) Prior Publication Data
US 2011/0299382 A1 Dec. 8, 2011

Related U.S. Application Data

(60) Provisional application No. 61/352,258, filed on Jun. 7, 2010.

(51) Int. Cl.
*H04J 11/00* (2006.01)
*H04L 27/26* (2006.01)

(52) U.S. Cl.
CPC ................... *H04L 27/2613* (2013.01)
USPC ......... 370/210; 370/312; 370/338; 370/395.3

(58) Field of Classification Search
CPC .. H04B 7/0413; H04B 7/0663; H04B 7/0697; H04B 7/0456; G06F 17/16; H03M 13/616
USPC .......... 370/210, 312, 338, 349, 395.3
See application file for complete search history.

(56) References Cited

U.S. PATENT DOCUMENTS

| 6,636,558 | B1 * | 10/2003 | Schnaufer et al. | 375/150 |
| 6,973,118 | B1 * | 12/2005 | Ikeda et al. | 375/146 |
| 7,372,913 | B2 | 5/2008 | Van Zelst et al. | |
| 8,437,440 | B1 * | 5/2013 | Zhang et al. | 375/366 |
| 2005/0238111 | A1 | 10/2005 | Wallace et al. | |
| 2009/0046003 | A1 * | 2/2009 | Tung et al. | 342/174 |

(Continued)

FOREIGN PATENT DOCUMENTS

| CN | 101416417 A | 4/2009 |
| EP | 1830502 A1 | 9/2007 |
| WO | WO-2005104399 A1 | 11/2005 |
| WO | WO-2006012523 A2 | 2/2006 |

OTHER PUBLICATIONS

IEEE Standard for Information technology, Telecommunications and information exchange between systems, Local and metropolitan area networks, Specific requirements, Part 11: Wireless LAN Medium Access Control (MAC) and Physical Layer (PHY) Specifications, IEEE Std 802.11-2012, Section 20.3.9.4.6, Equation (20-27), pp. 1703-1707, Mar. 29, 2012.

(Continued)

*Primary Examiner* — Andrew Chriss
*Assistant Examiner* — Romani Ohri
(74) *Attorney, Agent, or Firm* — Eric Ho

(57) ABSTRACT

A communication device for generating a matrix-mapped sequence is described. The communication device includes sequence generation circuitry. The communication device also includes mapping circuitry coupled to the sequence generation circuitry. The mapping circuitry applies a first matrix with at least one column multiplied by −1 to a sequence. The communication device also includes a transmit block coupled to the mapping circuitry.

38 Claims, 10 Drawing Sheets

(56) References Cited

U.S. PATENT DOCUMENTS

| | | | |
|---|---|---|---|
| 2009/0172052 A1* | 7/2009 | DeLaquil et al. | 708/109 |
| 2009/0262695 A1* | 10/2009 | Chen et al. | 370/329 |
| 2010/0248635 A1* | 9/2010 | Zhang et al. | 455/63.1 |

OTHER PUBLICATIONS

International Search Report and Written Opinion—PCT/US2011/038942, International Search Authority—European Patent Office—Sep. 23, 2011.

Youhan Kim: "Phase Tracking During VHT-LTF", Jul. 10, 2010, pp. 1-19, XP000002658372, Retrieved from the Internet: URL:https://mentor.ieee.org/802.11/documents?n=10&is_group=00ac [retrieved on Sep. 7, 2011].

20100526r0 Atheros, "Pilot Tones for VHT-LTFs and Data".

Vinko Erceg et al., IEEE 802.11-10/0566r2 ,"Sounding and P Matrix Proposal", May 16, 2010.

Robert S., "Specification Framework for TGac", IEEE 802.11-09/0992r11, May 1, 2010, pp. 1-10, XP002661826, Retrieved from the Internet: URL: https://mentor.ieee.org/802.11/dcn/09/11-09-0992-11-00ac-proposed-specificationframework-for-tgac.doc [retrieved on Oct. 20, 2011].

* cited by examiner

| L-STF 356 | L-LTF 358 | L-SIG 360 | VHT-SIG-A1 362a | VHT-SIG-A2 362b | VHT-STF 366 | (First) VHT-LTF 368a | (Second) VHT-LTF 368b | (Third) VHT-LTF 368c | (Fourth) VHT-LTF 368d | (Fifth) VHT-LTF 368e | (Sixth) VHT-LTF 368f | VHT-SIG-B 370 | Data Field (DATA) 372 |

802.11ac Preamble 364 spans VHT-SIG-A1 through VHT-SIG-B.

COMMUNICATION DEVICES FOR GENERATING AND USING A MATRIX-MAPPED SEQUENCE

RELATED APPLICATIONS

This application is related to and claims priority from U.S. Provisional Patent Application Ser. No. 61/352,258 filed Jun. 7, 2010, for "MAPPING MATRIX FOR 802.11AC VHT-LTF SYMBOLS", which is incorporated herein by reference.

TECHNICAL FIELD

The present disclosure relates generally to communication systems. More specifically, the present disclosure relates to communication devices for generating and using a matrix-mapped sequence.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

Use of communication devices has dramatically increased over the past few years. Communication devices often provide access to a network, such as a Local Area Network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., Wireless Fidelity or "Wi-Fi") standards. Communication device users, for example, often connect to wireless networks using such communication devices.

As the use of communication devices has increased, advancements in communication device capacity, reliability and efficiency are being sought. Systems and methods that improve communication device capacity, reliability and/or efficiency may be beneficial.

SUMMARY

A communication device for generating a matrix-mapped sequence is disclosed. The communication device includes sequence generation circuitry. The communication device also includes mapping circuitry coupled to the sequence generation circuitry. The mapping circuitry applies a first matrix with at least one column multiplied by −1 to a sequence. The communication device additionally includes a transmit block coupled to the mapping circuitry. The sequence may be a Very High Throughput Long Training Field (VHT-LTF) sequence. The communication device may be an access point. The communication device may be a station.

The first matrix may be a discrete Fourier transform (DFT) matrix. The first matrix may be given according to an equation $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}.$$

$P_{6\times 6}$ may be the first matrix and w may be equal to $$\exp\left(\frac{-j2\pi}{6}\right).$$

The first matrix may be applied to six sequences on five or six streams.

The mapping circuitry may apply a second matrix to a pilot sequence. The second matrix may include a number of replicas of a first row of the first matrix.

A communication device for using a matrix-mapped sequence is also disclosed. The communication device may include a receive block. The receive block receives a sequence that is mapped according to a first matrix with at least one column multiplied by −1. The communication device also includes channel estimation circuitry coupled to the receive block. The sequence may be a Very High Throughput Long Training Field (VHT-LTF) sequence. The channel estimation circuitry may estimate a channel based on the sequence. The communication device may be an access point. The communication device may be a station.

The first matrix may be a discrete Fourier transform (DFT) matrix. The first matrix may be given according to an equation $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}.$$

$P_{6\times 6}$ may be the first matrix and w may be equal to $$\exp\left(\frac{-j2\pi}{6}\right).$$

The receive block may receive six sequences that are mapped according to the first matrix with at least one column multiplied by −1.

The receive block may receive a pilot sequence that is mapped according to a second matrix. The second matrix may include a number of replicas of a first row of the first matrix.

The communication device may also include transmitter circuitry coupled to the channel estimation circuitry. The transmitter circuitry may transmit a channel estimate based on the sequence.

A method for generating a matrix-mapped sequence on a communication device is also disclosed. The method includes generating a sequence. The method also includes applying a first matrix with at least one column multiplied by −1 to the sequence. The method further includes transmitting the sequence.

A method for using a matrix-mapped sequence on a communication device is also disclosed. The method includes receiving a sequence that is mapped according to a first matrix with at least one column multiplied by −1. The method also includes estimating a channel.

A computer-program product for generating a matrix-mapped sequence is also disclosed. The computer-program product includes a non-transitory tangible computer-readable medium with instructions. The instructions include code for causing a communication device to generate a sequence. The instructions also include code for causing the communication device to apply a first matrix with at least one column multiplied by −1 to the sequence. The instructions further include code for causing the communication device to transmit the sequence.

A computer-program product for using a matrix-mapped sequence is also disclosed. The computer-program product includes a non-transitory tangible computer-readable medium with instructions. The instructions include code for causing a communication device to receive a sequence that is mapped according to a first matrix with at least one column multiplied by −1. The instructions also include code for causing the communication device to estimate a channel.

An apparatus for generating a matrix-mapped sequence is also disclosed. The apparatus includes means for generating a sequence. The apparatus also includes means for applying a first matrix with at least one column multiplied by −1 to the sequence. The apparatus additionally includes means for transmitting the sequence.

An apparatus for using a matrix-mapped sequence is also disclosed. The apparatus includes means for receiving a sequence that is mapped according to a first matrix with at least one column multiplied by −1. The apparatus also includes means for estimating a channel.

BRIEF DESCRIPTION OF THE DRAWINGS

FIG. 3 is a diagram illustrating a more specific example of a communication frame that may be used in accordance with the systems and methods disclosed herein;

DETAILED DESCRIPTION

Figure 1:
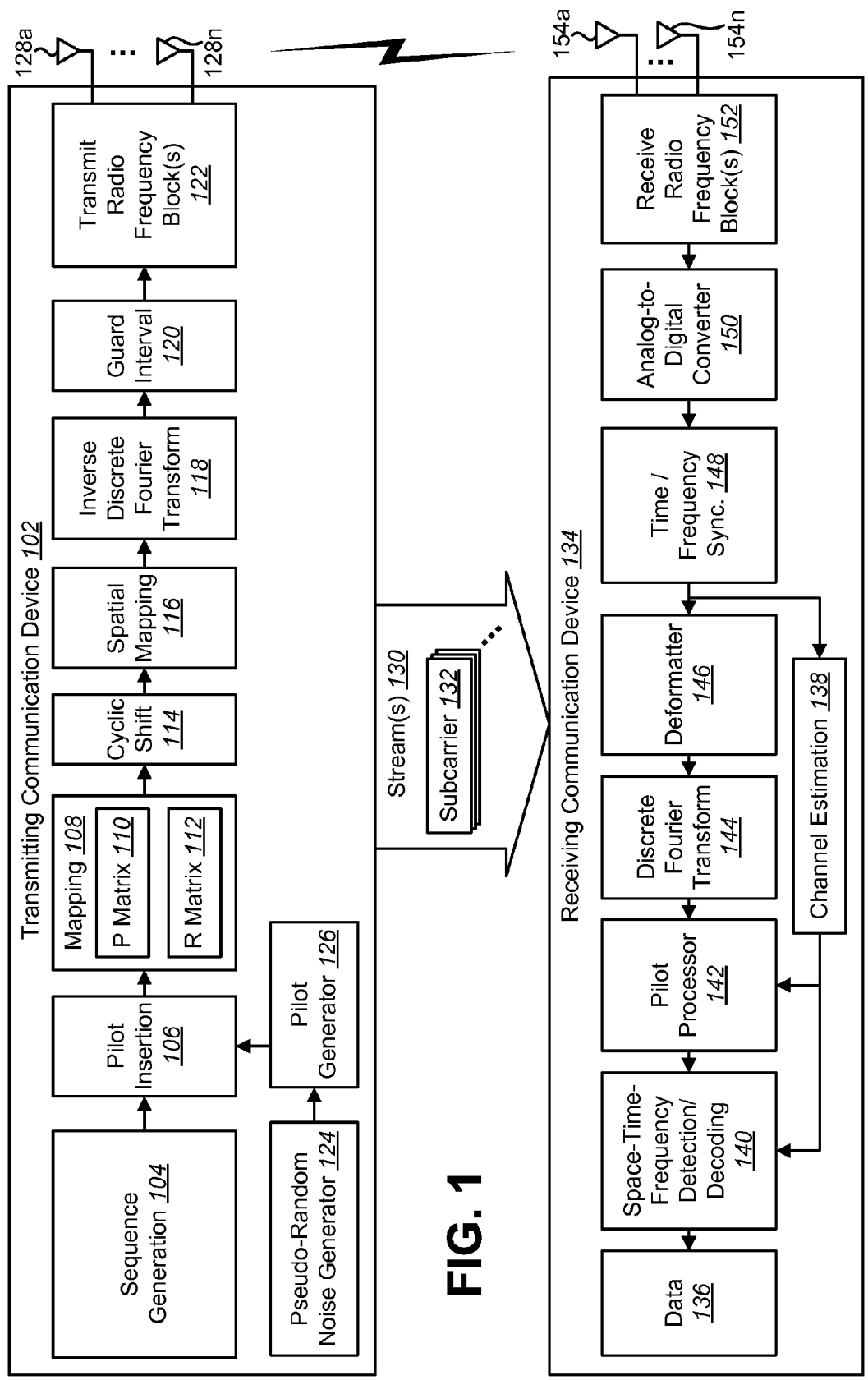
FIG. 1 is a block diagram illustrating one configuration of a transmitting communication device and a receiving communication device in which systems and methods for generating and using a matrix-mapped sequence may be implemented.

Examples of communication devices include cellular telephone base stations or nodes, access points (APs), wireless gateways and wireless routers. A communication device may operate in accordance with certain industry standards, such as the Institute of Electrical and Electronics Engineers (IEEE) 802.11a, 802.11b, 802.11g, 802.11n and/or 802.11ac (e.g., Wireless Fidelity or "Wi-Fi") standards. Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE) and others (e.g., where a communication device may be referred to as a Node B, evolved Node B (eNB), etc.). While some of the systems and methods disclosed herein may be described in terms of one or more standards, this should not limit the scope of the disclosure, as the systems and methods may be applicable to many systems and/or standards.

Some communication devices (e.g., stations (STAs), access terminals, client devices, client stations, etc.) may wirelessly communicate with other communication devices. Some communication devices may be referred to as stations (STAs), mobile devices, mobile stations, subscriber stations, user equipments (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., station (STA), access terminal, user equipment (UE), remote terminal, access point (AP), base station, Node B, evolved Node B (eNB), etc.).

Some communication devices may be capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc.

It should be noted that the terms "couple," "coupling," "coupled" or other variations of the word couple as used herein may indicate either an indirect connection or a direct connection. For example, if a first component is "coupled" to a second component, the first component may be either indirectly connected (e.g., through another component) to the second component or directly connected to the second component. Additionally, it should be noted that as used herein, designating a component, element or entity as a "first," "second," "third" or "fourth" component may be arbitrary and is used to distinguish components, elements or entities for explanatory clarity. It should also be noted that labels used to designate a "second," "third" or "fourth," etc. do not necessarily imply that elements using preceding labels "first," "second" or "third," etc. are included or used. For example, simply because an element or component is labeled a "third" component does not necessarily imply that "first" and "second" elements or components exist or are used. In other words, the numerical labels (e.g., first, second, third, fourth, etc.) are labels used for ease in explanation and do not necessarily imply a particular number of elements, a particular order or a particular structure. Thus, entities may be labeled or numbered in any manner.

The IEEE 802.11 group's current work involves standardizing a new and faster version of 802.11, under the name VHT (Very High Throughput). This extension may be referred to as 802.11ac. The use of additional signal bandwidth (BW) is also being considered such as transmissions using 80 megahertz (MHz) and 160 MHz. Physical-layer (PHY) preambles may be used that allow for both increased signal bandwidth and that allow backward compatibility to 802.11n, 802.11a, and 802.11.

An 802.11ac frame with a preamble may be structured including several fields. In one configuration, an 802.11ac frame may include a legacy short training field or non-high throughput short training field (L-STF), a legacy long training field or non-high throughput long training field (L-LTF), a legacy signal field or non-high throughput signal field (L-SIG), one or more very high throughput signal fields A (VHT-SIG-A), a very high throughput short training field (VHT-STF), one or more very high throughput long training fields (VHT-LTFs), a very high throughput signal field B (VHT-SIG-B) and a data field (e.g., DATA or VHT-DATA). In some configurations, multiple VHT-SIG-As may be used (e.g., a VHT-SIG-A1 and a VHT-SIG-A2).

The systems and methods disclosed herein describe communication devices for generating and using a matrix-mapped sequence. In some configurations, the systems and methods disclosed herein may be applied to IEEE 802.11 specifications. In an IEEE meeting, a six-by-six (e.g., 6×6) discrete Fourier transform (DFT) matrix was adopted as a matrix P (or "P matrix," for example) for five or six space-time streams (in total). Furthermore, a motion was adopted for using a matrix R (or "R matrix," for example) for pilot mapping in a very high throughput long training field (VHT-LTF), where R comprises $N_{STS}$ replicas of the first row of P and $N_{STS}$ is a number of space-time streams.

One reason for choosing this R matrix was to avoid spectral lines on the pilots, which would happen if R is all ones. However, R is all ones for the case of six VHT-LTFs, since the first row of the six-by-six P matrix (e.g., DFT matrix) consists of ones only when the systems and methods disclosed herein are not used. However, the systems and methods disclosed herein may resolve this problem by multiplying one or more columns of the P matrix (e.g., DFT matrix) by −1.

In one configuration, for instance, two columns of a six-by-six P matrix may be multiplied by −1. One example of a modified six-by-six P matrix is illustrated in Equation (1).

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad (1)$$

In Equation (1), $P_{6\times 6}$ is the P matrix and $$w = \exp\left(\frac{-j2\pi}{6}\right).$$

It may be observed that the first row of $P_{6\times 6}$ in Equation (1) may be equal to the first row of a four-by-four P matrix {1,−1,1,1}, with the first two values repeated at the end. It should be noted that multiplying any column by −1 does not change the orthogonality of the P matrix.

Other alternative P matrices may be used in accordance with the systems and methods disclosed herein. However, the modified P matrix illustrated in Equation (1) may be a logical choice as it reuses an existing four-by-four (e.g., 4×4) P matrix that may also be used for an eight-by-eight (8×8) P matrix. Nevertheless, many alternatives may be used depending on the configuration. Other alternatives may be made by multiplying any column or number of columns of an original six-by-six (e.g., 6×6) P matrix by −1. One example of an alternative is illustrated in Equation (2).

$$P_{6\times 6} = \begin{bmatrix} 1 & -1 & 1 & 1 & -1 & -1 \\ 1 & -w^1 & w^2 & w^3 & -w^4 & -w^5 \\ 1 & -w^2 & w^4 & w^6 & -w^8 & -w^{10} \\ 1 & -w^3 & w^6 & w^9 & -w^{12} & -w^{15} \\ 1 & -w^4 & w^8 & w^{12} & -w^{16} & -w^{20} \\ 1 & -w^5 & w^{10} & w^{15} & -w^{20} & -w^{25} \end{bmatrix} \quad (2)$$

In Equation (2), $P_{6\times 6}$ is another example of a P matrix and $$w = \exp\left(\frac{-j2\pi}{6}\right).$$

In this example, the first row is equal to a first row of four-by-four (e.g., 4×4) P matrix {1,−1,1,1} with two −1 values added. This example provides a zero direct current (DC) component in the first row that minimizes the spectral line.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a transmitting communication device 102 and a receiving communication device 134 in which systems and methods for generating and using a matrix-mapped sequence may be implemented. Examples of the transmitting communication device 102 may include access points, access terminals, base stations, user equipments (UEs), stations (STAs), etc. Examples of the receiving communication device 134 may include access points, access terminals, base stations, user equipments (UEs), stations (STAs), etc. The transmitting communication device 102 may include a sequence generation block/module 104, a pilot insertion block/module 106, a mapping block/module 108, a cyclic shift block/module 114, a spatial mapping block/module 116, an Inverse Discrete Fourier Transform (IDFT) block/module 118, a guard interval block/module 120, one or more transmit radio frequency blocks 122, one or more antennas 128a-n, a pseudo-random noise generator 124 and/or a pilot generator 126.

It should be noted that one or more of the elements 104, 106, 108, 114, 116, 118, 120, 122, 124, 126 included in the transmitting communication device 102 may be implemented in hardware, software or a combination of both. For instance, one or more of the elements 104, 106, 108, 114, 116, 118, 120, 122, 124, 126 included in the transmitting communication device 102 may be implemented as circuitry (e.g., integrated circuits, application specific integrated circuits (ASICs), a processor, etc.) and/or using a processor and instructions. For instance, the systems and methods disclosed herein may be implemented using a processor and/or may be hard-coded in a register transfer level (RTL) in a communication device (e.g., transmitting communication device 102, receiving communication device 134, etc.). Furthermore, the term "block/module" may be used to indicate that a particular element may be implemented in hardware, software or a combination of both.

It should also be noted that although some of the elements 104, 106, 108, 114, 116, 118, 120, 122, 124, 126 may be illustrated as a single block, one or more of the elements 104, 106, 108, 114, 116, 118, 120, 122, 124, 126 illustrated may comprise multiple parallel blocks/modules in some configurations. For instance, multiple sequence generation blocks/modules 104, multiple pilot insertion blocks/modules 106, multiple mapping blocks/modules 108, multiple cyclic shift blocks/modules 114, multiple spatial mapping blocks/modules 116, multiple inverse discrete Fourier transform blocks/modules 118, multiple guard interval blocks/modules 120 and/or multiple transmit radio frequency blocks 122 may be used to form multiple paths in some configurations.

For instance, separate streams 130 (e.g., space-time streams 130, spatial streams 130, etc.) may be generated and/or transmitted using separate paths. In some implementations, these paths are implemented with distinct hardware, whereas in other implementations, the path hardware is reused for more than one stream 130 or the path logic is implemented in software that executes for one or more streams 130. More specifically, each of the elements illustrated in the transmitting communication device 102 may be implemented as a single block/module or as multiple blocks/modules.

The sequence generation block/module 104 may generate one or more sequences (e.g., training sequences, "VHT-LTF data," "VHT-LTF sequences," etc.). For example, the sequence generation block/module 104 may generate one or more training sequences for each VHT-LTF to be transmitted in a frame. In some configurations, the sequence generation block/module 104 may generate a sequence in the frequency domain based on an amount of transmission bandwidth. For example, different sequences may be generated based on whether 20 megahertz (MHz), 40 MHz, 80 MHz or 160 MHz of bandwidth is allocated for transmission. The sequence(s) may be provided to the pilot insertion block/module 106.

The pilot generator 126 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The transmitting communication device 102 may include a pseudo-random noise generator 124 in some configurations. The pseudo-random noise generator 124 may generate a pseudo-random noise sequence or signal (e.g., values) used to scramble the pilot sequence. For example, the pilot sequence for successive orthogonal frequency-division multiplexing (OFDM) symbols may be multiplied by successive numbers from the pseudo-random noise sequence, thereby scrambling the pilot sequence per OFDM symbol.

The pilot insertion block/module 106 inserts pilot tones into pilot tone subcarriers 132. For example, the pilot sequence may be mapped to subcarriers 132 at particular indices. For instance, pilot symbols from the (scrambled) pilot sequence may be mapped to pilot subcarriers 132 that are interspersed with data subcarriers 132 and/or other subcarriers 132. In other words, the pilot sequence or signal may be combined with the data sequence or signal. In some configurations, one or more direct current (DC) tones may be centered at a subcarrier index 0. The pilot insertion block/module 106 may apply phase rotation to the combined signal (e.g., to one or more 20 MHz subbands) in some configurations.

The combined data and pilot signal may be provided to the mapping block/module 108. The mapping block/module 108 may apply matrix mapping to the data tones (e.g., a training sequence) and/or to the pilot tones (e.g., pilot sequence) included in the combined signal to produce a matrix-mapped signal. The mapping block/module 108 may include a first matrix 110 and/or a second matrix 112. For convenience, the first matrix 110 is illustrated as and may be referred to as a P matrix 110. Furthermore, the second matrix 112 is illustrated as and may be referred to as an R matrix 112. However, it should be noted that the first matrix 110 and the second matrix 112 may be referred to differently in other configurations. It should be noted that the functionality of the mapping block/module 108, the P matrix 110 and/or the R matrix 112 may be implemented using a processor and/or hard-coded in an RTL on the transmitting communication device 102 in some configurations.

In one example, the first matrix 110 (e.g., P matrix 110) provides a mapping for the data tones (e.g., sequence, training sequence, etc.) in one or more very high throughput long training fields (VHT-LTFs). The first matrix 110 (e.g., P matrix 110) may have at least one of its 110 columns multiplied by −1. For example, the first matrix 110 may be a DFT matrix $P_{original}$ that has had one or more of its columns multiplied by −1, where $P_{original}$ is given in Equation (3).

$$P_{original} = \begin{bmatrix} 1 & 1 & 1 & 1 & 1 & 1 \\ 1 & w^1 & w^2 & w^3 & w^4 & w^5 \\ 1 & w^2 & w^4 & w^6 & w^8 & w^{10} \\ 1 & w^3 & w^6 & w^9 & w^{12} & w^{15} \\ 1 & w^4 & w^8 & w^{12} & w^{16} & w^{20} \\ 1 & w^5 & w^{10} & w^{15} & w^{20} & w^{25} \end{bmatrix} \quad (3)$$

In Equation (3), $$w = \exp\left(\frac{-j2\pi}{6}\right).$$

One specific example of the first matrix 110 (e.g., P matrix 110) is $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$

as given above in Equation (1). The example given in Equation (1) may be used because the first row of $P_{6\times 6}$ in Equation (1) may be equal to the first row of a four-by-four P matrix {1,−1,1,1}, with the first two values repeated at the end. It should be noted that multiplying any column by −1 does not change the orthogonality of the P matrix 110. Another specific example of the first matrix 110 (e.g., P matrix 110) is given above in Equation (2).

The data tones (e.g., training sequence, VHT-LTF sequence) in the combined signal may be multiplied by elements of the P matrix 110. For example, each column of the P matrix 110 may correspond to a VHT-LTF and each row of the P matrix 110 may correspond to a stream 130. Thus, the example of the P matrix 110 given in Equation (1) may be applied to six sequences (e.g., six VHT-LTFs) on six streams 130 (e.g., spatial streams 130 or space-time streams 130). More specifically, for instance, data tones in a first VHT-LTF on a first stream 130 may be multiplied by the element in the first column and first row of the P matrix 110. Furthermore, data tones in a second VHT-LTF on a first stream may be multiplied by the second element in the first row of the P matrix 110 and so on. It should be noted that a six-by-six P matrix 110 may be applied when five or six streams 130 (e.g., spatial streams 130, space-time streams 130) are used for transmitting data tones (e.g., one or more training sequences) in some configurations. Other P matrices may be used for different numbers of streams 130, for instance.

In one configuration, the second matrix 112 (e.g., R matrix 112) provides a mapping for the pilot tones in one or more VHT-LTFs. For example, the pilot tones in one or more VHT-LTFs on one or more streams 130 (e.g., spatial streams 130 or space-time streams 130) may be multiplied by the R matrix 112.

The second matrix 112 (e.g., R matrix 112) may include a number of replicas of the first row of the first matrix 110 (e.g., P matrix 110). In one configuration, the R matrix 112 includes $N_{STS}$ replicas of the first row of the P matrix 110, where $N_{STS}$ is a number of space-time streams 130. As described above, one problem addressed by the systems and methods disclosed herein is the formation of spectral lines on the pilots. This may occur if the first row of a P matrix is all ones in the case of six VHT-LTFs. However, in accordance with the systems and methods disclosed herein, one or more of the columns of the P matrix 110 may be multiplied by −1, thus avoiding a first row of all ones in the P matrix 110.

The output of the mapping block/module 108 (e.g., a matrix-mapped signal) may be provided to the cyclic shift block/module 114. The cyclic shift block/module 114 may insert cyclic shifts to one or more streams 130 (e.g., spatial streams 130 or space-time streams 130) for cyclic shift diversity (CSD). In one configuration, cyclic shifts may be applied to multiple transmit chains.

The output of the cyclic shift block/module 114 may be provided to a spatial mapping block/module 116. The spatial mapping block/module 116 may map output of the cyclic shift block/module 114 (e.g., data tones and/or pilot tones) to one or more streams 130 (e.g., spatial streams 130 or space-time streams 130).

The IDFT block/module 118 may perform an inverse discrete Fourier transform on the signal provided by the spatial mapping block/module 116. For example, the inverse discrete Fourier transform (IDFT) block/module 118 converts the frequency signals of the data tones and/or pilot tones into time domain signals representing the signal over the streams 130 and/or time-domain samples for a symbol period. In one configuration, for example, the IDFT block/module 118 may perform an inverse fast Fourier transform (IFFT).

The signal output from the IDFT block/module 118 may be provided to the guard interval block/module 120. The guard interval block/module 120 may insert (e.g., prepend) a guard interval to the signal output from the IDFT block/module 118. For example, the guard interval block/module 120 may insert an 800 nanosecond (ns) guard interval. In some configurations, the guard interval block/module 120 may additionally perform windowing on the signal.

The output of the guard interval block/module 120 may be provided to the transmit radio frequency block(s) 122. The transmit radio frequency block(s) 122 may upconvert the output of the guard interval block/module 120 (e.g., a complex baseband waveform) and transmit the resulting signal using the one or more antennas 128a-n. For example, the one or more transmit radio frequency block(s) 122 may output radio-frequency (RF) signals to one or more antennas 128a-n, thereby transmitting the data tones (e.g., VHT-LTF sequence) and/or pilot tones (e.g., VHT-LTF pilots) over a wireless medium suitably configured for receipt by one or more receiving communication devices 134.

It should be noted that the transmitting communication device 102 may determine channel bandwidth to be used for transmissions to one or more receiving communication devices 134. This determination may be based on one or more factors, such as receiving communication device 134 compatibility, number of receiving communication devices 134 (to use the communication channel), channel quality (e.g., channel noise) and/or a received indicator, etc. In one configuration, the transmitting communication device 102 may determine whether the bandwidth for signal transmission is 20 MHz, 40 MHz, 80 MHz or 160 MHz.

One or more of the elements 104, 106, 108, 114, 116, 118, 120, 122, 124, 126 included in the transmitting communication device 102 may operate based on the bandwidth determination. For example, the sequence generation block/module 104 may generate one or more particular training sequences (e.g., VHT-LTF data tones) based on transmission bandwidth. Additionally or alternatively, the pilot generator 126 may generate a number of pilot symbols based on the bandwidth for signal transmission. For example, the pilot generator 126 may generate a certain number of pilot symbols for an 80 MHz signal. It should be noted that the tones or subcarriers 132 may be orthogonal frequency-division multiplexing (OFDM) subcarriers 132 in some configurations.

Additionally, the pilot insertion block/module 106 may insert pilot tones based on a bandwidth for signal transmission. For instance, the pilot insertion block/module 106 may insert pilot symbols into pilot tones (e.g., pilot subcarriers 132) based on a bandwidth for signal transmission.

Additionally, the mapping block/module 108 may matrix map the data tones and/or pilot tones based on the bandwidth for signal transmission. For instance, the mapping block/ module 108 may matrix map a number of data tones (e.g., data subcarriers 132) and a number of pilot tones (e.g., pilot subcarriers 132) based on a bandwidth for signal transmission.

One or more streams 130 may be transmitted from the transmitting communication device 102 such that the transmissions on different streams 130 may be differentiable at a receiving communication device 134 (with some probability). For example, bits mapped to one spatial dimension are transmitted as one stream 130. That stream 130 might be transmitted on its own antenna 128 spatially separate from other antennas 128, its own orthogonal superposition over a plurality of spatially-separated antennas 128, its own polarization, etc. Many techniques for stream 130 separation (involving separating antennas 128 in space or other techniques that would allow their signals to be distinguished at a receiver, for example) are known and can be used. In the example shown in FIG. 1, there are one or more streams 130 that are transmitted using the same or a different number of antennas 128*a-n* (e.g., one or more).

In the case that the transmitting communication device 102 uses a plurality of frequency subcarriers 132, there are multiple values for the frequency dimension, such that some data (e.g., some VHT-LTF data) may be mapped to one frequency subcarrier 132 and other data (e.g., other VHT-LTF data) to another frequency subcarrier 132. Other frequency subcarriers 132 may be reserved as guard bands, pilot tone subcarriers 132, or the like that do not (or do not always) carry data. For example, there may be one or more data subcarriers 132 and one or more pilot subcarriers 132. It should be noted that, in some instances or configurations, not all subcarriers 132 may be excited at once. For instance, some tones may not be excited to enable filtering. In one configuration, the transmitting communication device 102 may utilize orthogonal frequency-division multiplexing (OFDM) for the transmission of multiple subcarriers 132.

The time dimension refers to symbol periods. Different bits may be allocated to different symbol periods. Where there are multiple streams 130, multiple subcarriers 132 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of streams 130 times the number of data subcarriers 132, divided by the length of the symbol period.

One or more receiving communication devices 134 may receive and use signals from the transmitting communication device 102. For example, a receiving communication device 134 may use a received bandwidth indicator to receive a given number of OFDM tones or subcarriers 132. In one configuration, a receiving communication device 134 may use a VHT-LTF sequence generated by and received from the transmitting communication device 102 to estimate the channel.

It should be noted that one or more of the elements 138, 140, 142, 144, 146, 148, 150, 152 included in the receiving communication device 134 may be implemented in hardware, software or a combination of both. For instance, one or more of the elements 138, 140, 142, 144, 146, 148, 150, 152 included in the receiving communication device 134 may be implemented as circuitry (e.g., integrated circuits, application specific integrated circuits (ASICs), a processor, etc.) and/or using a processor and instructions. For instance, the systems and methods disclosed herein may be implemented using a processor and/or may be hard-coded in a register transfer level (RTL) in a communication device (e.g., transmitting communication device 102, receiving communication device 134, etc.). It should also be noted that although some of the elements 138, 140, 142, 144, 146, 148, 150, 152 may be illustrated as a single block, one or more of the elements 138, 140, 142, 144, 146, 148, 150, 152 illustrated may comprise multiple parallel blocks/modules in some configurations.

A receiving communication device 134 may include one or more antennas 154*a-n* (which may be greater than, less than or equal to the number of transmitting communication device 102 antennas 128*a-n* and/or the number of streams 130) that feed to one or more receive radio frequency blocks 152. The receive radio frequency block(s) 152 (e.g., receive block(s)) may output analog signals to one or more analog-to-digital converters (ADCs) 150. For example, a receive radio-frequency block 152 may receive and downconvert a signal, which may be provided to an analog-to-digital converter 150. As with the transmitting communication device 102, the number of streams 130 processed may or may not be equal to the number of antennas 154*a-n*. Furthermore, each stream 130 need not be limited to one antenna 154, as various beam-steering, orthogonalization, etc. techniques may be used to arrive at a plurality of receiver streams.

The one or more analog-to-digital converters (ADCs) 150 may convert the received analog signal(s) to one or more digital signal(s). The output(s) of the one or more analog-to-digital converters (ADCs) 150 may be provided to one or more time and/or frequency synchronization blocks/modules 148. A time and/or frequency synchronization block/module 148 may (attempt to) synchronize or align the digital signal in time and/or frequency (to a receiving communication device 134 clock, for example).

The (synchronized) output of the time and/or frequency synchronization block(s)/module(s) 148 may be provided to one or more deformatters 146. For example, a deformatter 146 may receive an output of the time and/or frequency synchronization block(s)/module(s) 148, remove guard intervals, etc. and/or parallelize the data for discrete Fourier transform (DFT) processing.

One or more deformatter 146 outputs may be provided to one or more discrete Fourier transform (DFT) blocks/modules 144. The discrete Fourier transform (DFT) blocks/modules 144 may convert one or more signals from the time domain to the frequency domain. A pilot processor 142 may use the frequency domain signals (per stream 130, for example) to determine one or more pilot tones (over the streams 130, frequency subcarriers 132 and/or groups of symbol periods, for example) sent by the transmitting communication device 102. The pilot processor 142 may additionally or alternatively de-scramble the pilot sequence. The pilot processor 142 may use one or more pilot sequences described herein for phase, frequency and/or amplitude tracking. The pilot tone(s) may be provided to a space-time-frequency detection and/or decoding block/module 140, which may detect and/or decode the data over the various dimensions. The space-time-frequency detection and/or decoding block/module 140 may output received data 136 (e.g., the receiving communication device's 134 estimation of data transmitted by the transmitting communication device 102).

In some configurations, the receiving communication device 134 knows the sequences (e.g., VHT-LTF data, training sequences, etc.) sent as part of a total information sequence. The receiving communication device 134 may perform channel estimation with the aid of these known sequences. To assist with pilot tone tracking, processing and/or data detection and decoding, a channel estimation block/module 138 (e.g., channel estimation circuitry 138) may provide estimation signals (e.g., channel estimates) to the pilot processor 142 and/or the space-time-frequency detection and/or decoding block/module 140 based on the output from the time and/or frequency synchronization block/module 148. Alternatively, if the de-formatting and discrete Fourier transform is the same for the known transmit sequences as for the payload data portion of the total information sequence, the estimation signals may be provided to the pilot processor 142 and/or the space-time-frequency detection and/or decoding block/module 140 based on the output from the discrete Fourier transform (DFT) blocks/modules 144.

In accordance with the systems and methods disclosed herein, the receiving communication device 134 may receive a sequence (e.g., VHT-LTF data) that is mapped according to a matrix with a least one column multiplied by −1. For example, the receiving communication device 134 may receive a VHT-LTF sequence or VHT-LTF data (e.g., training sequence) that has been mapped using the P matrix 110 that has at least one of its columns multiplied by −1. For instance, the DFT matrix illustrated in Equation (3) with one or more of its columns multiplied by −1 may be used to map the VHT-LTF data or sequence that is received by the receiving communication device 134.

The receiving communication device 134 (e.g., channel estimation block/module 138) may use the received data or sequence to generate a channel estimate. The receiving communication device 134 may use the channel estimate to improve communications between the transmitting communication device 102 and the receiving communication device 134. For example, the receiving communication device 134 may use the channel estimate to better receive (e.g., demodulate, decode, etc.) data sent from the transmitting communication device 102. Additionally or alternatively, the receiving communication device 134 may send the channel estimate (as feedback) to the transmitting communication device 102 for use in precoding, beamsteering, etc. In some configurations, for instance, the receiving communication device 134 may include a transmitter or transmitter circuitry (not shown in FIG. 1) for transmitting the channel estimate to the transmitting communication device 102. Accordingly, the transmitting communication device 102 may also include a receiver (not shown in FIG. 1) for receiving signals (such as the channel estimate) from the receiving communication device 134 in some configurations. Received pilot tones in the VHT-LTF may be used to track frequency and phase offset in received transmissions.

In some configurations, the receiving communication device 134 may determine a channel bandwidth (for received communications). For example, the receiving communication device 134 may receive a bandwidth indication from the transmitting communication device 102 that indicates a channel bandwidth. For instance, the receiving communication device 134 may obtain an explicit or implicit bandwidth indication. In one configuration, the bandwidth indication may indicate a channel bandwidth of 20 MHz, 40 MHz, 80 MHz or 160 MHz. The receiving communication device 134 may determine the bandwidth for received communications based on this indication and provide an indication of the determined bandwidth to the pilot processor 142 and/or to the space-time-frequency detection/decoding block/module 140.

Figure 2:
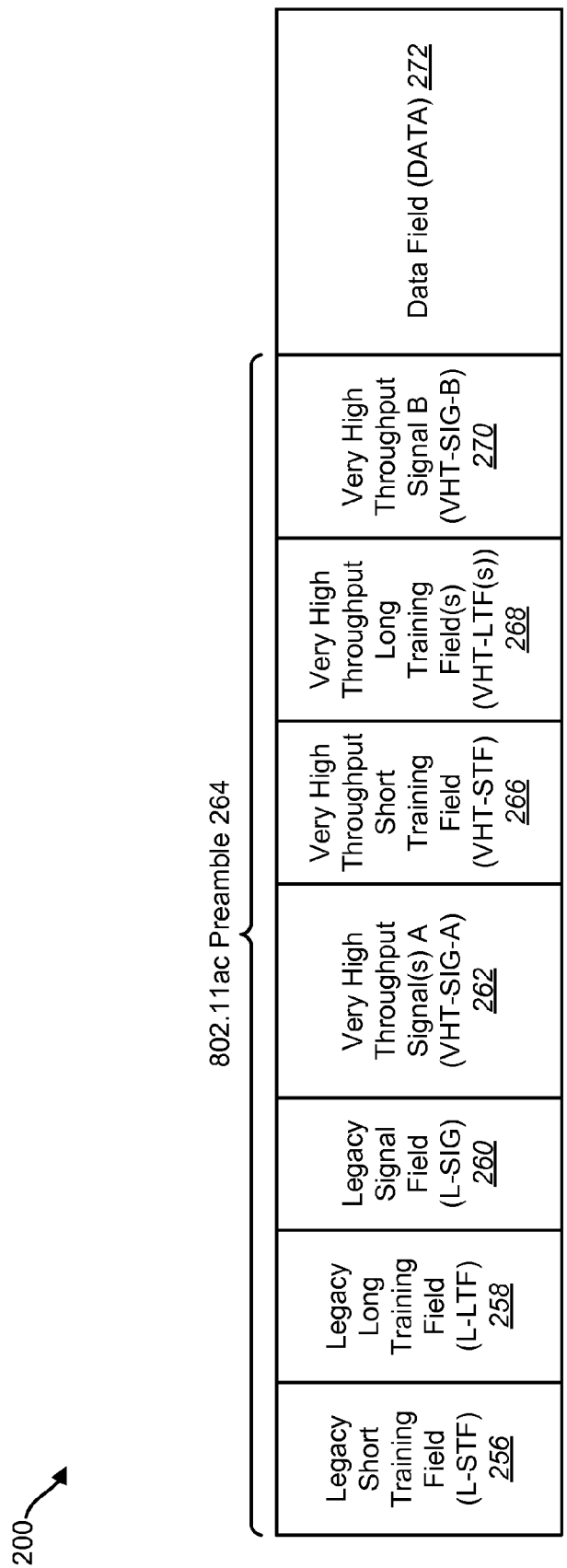
FIG. 2 is a diagram illustrating one example of a communication frame that may be used in accordance with the systems and methods disclosed herein.

FIG. 2 is a diagram illustrating one example of a communication frame 200 that may be used in accordance with the systems and methods disclosed herein. The frame 200 may include one or more sections or fields for preamble symbols, pilot symbols and/or data symbols. For example, the frame 200 may comprise an 802.11ac preamble 264 and a data field 272 (e.g., DATA or VHT-DATA field). In one configuration, the 802.11ac preamble 264 may have a duration of 40 to 68 microseconds (µs). The preamble 264 and/or pilot symbols may be used (by a receiving communication device 134, for example) to synchronize, detect, demodulate and/or decode data included in the frame 200.

The frame 200 with an 802.11ac preamble 264 may be structured including several fields. In one configuration, an 802.11ac frame 200 may include a legacy short training field or non-high throughput short training field (L-STF) 256, a legacy long training field or non-high throughput long training field (L-LTF) 258, a legacy signal field or non-high throughput signal field (L-SIG) 260, one or more very high throughput signal symbols or fields A (VHT-SIG-A) 262 (e.g., VHT-SIG-A1, VHT-SIG-A2, etc.), a very high throughput short training field (VHT-STF) 266, one or more very high throughput long training fields (VHT-LTFs) 268, a very high throughput signal field B (VHT-SIG-B) 270 and a data field (DATA) 272.

The 802.11ac preamble 264 may accommodate backwards compatibility (with earlier 802.11 specifications, for instance). The first part of the preamble 264 may include the L-STF 256, L-LTF 258, L-SIG 260 and VHT-SIG-A 262. This first part of the preamble 264 may be decodable by legacy devices (e.g., devices that comply with legacy or earlier specifications).

A second part of the preamble 264 includes the VHT-STF 266, one or more VHT-LTFs 268, and the VHT-SIG-B 270. The second part of the preamble 264 may not be decodable by legacy devices (or even by all 802.11ac devices, for instance).

The 802.11ac preamble 264 may include some control data that is decodable by legacy 802.11a and 802.11n receivers. This control data may be contained in the L-SIG 260. The data in the L-SIG 260 informs all receivers how long the transmission will occupy the wireless medium, so that all devices may defer their transmissions for an accurate amount of time. Additionally, the 802.11ac preamble 264 may allow 802.11ac devices to distinguish the transmission as an 802.11ac transmission (and avoid determining that the transmission is in an 802.11a or 802.11n format, for example).

In accordance with the systems and methods disclosed herein, the one or more VHT-LTFs 268 may be mapped using a first matrix (e.g., P matrix) 110 with at least one column multiplied by −1. For example, when five or six streams 130 are used for transmitting VHT-LTFs 268, then six VHT-LTFs 268 may be used in the frame (e.g., packet) 200. A transmitting communication device 102 may apply the first matrix (e.g., P matrix) 110 to a sequence (e.g., VHT-LTF data) included in each VHT-LTF 268. For instance, the first matrix (e.g., P matrix) 110 may be applied to six sequences (e.g., VHT-LTFs 268) on five or six streams 130. The transmitting communication device 102 may additionally apply a second matrix (e.g., R matrix) 112 to pilots (e.g., a pilot sequence) included in each VHT-LTF 268.

FIG. 3 is a diagram illustrating a more specific example of a communication frame 300 that may be used in accordance with the systems and methods disclosed herein. The frame 300 may include one or more sections or fields for preamble symbols, pilot symbols and/or data symbols. For example, the frame 300 may comprise an 802.11ac preamble 364 and a data field 372 (e.g., DATA or VHT-DATA field). In one configuration, the 802.11ac preamble 364 may have a duration of 40 to 68 µs. The preamble 364 and/or pilot symbols may be used (by a receiving communication device 134, for example) to synchronize, detect, demodulate and/or decode data included in the frame 300.

The frame 300 with an 802.11ac preamble 364 may be structured including several fields. In one configuration, an 802.11ac frame 300 may include a legacy short training field or non-high throughput short training field (L-STF) 356, a legacy long training field or non-high throughput long training field (L-LTF) 358, a legacy signal field or non-high throughput signal field (L-SIG) 360, a very high throughput signal field A1 (VHT-SIG-A1) 362*a*, a VHT-SIG-A2 362*b*, a very high throughput short training field (VHT-STF) 366, six very high throughput long training fields (VHT-LTFs) 368*a-f*, a very high throughput signal field B (VHT-SIG-B) 370 and a data field (DATA) 372.

The 802.11ac preamble 364 may accommodate backwards compatibility (with earlier 802.11 specifications, for instance). The first part of the preamble 364 may include the L-STF 356, L-LTF 358, L-SIG 360, VHT-SIG-A1 362*a* and VHT-SIG-A2 362*b*. This first part of the preamble 364 may be decodable by legacy devices (e.g., devices that comply with legacy or earlier specifications).

A second part of the preamble 364 includes the VHT-STF 366, six VHT-LTFs 368*a-f*, and the VHT-SIG-B 370. The second part of the preamble 364 may not be decodable by legacy devices (or even by all 802.11ac devices, for instance).

The 802.11ac preamble 364 may include some control data that is decodable by legacy 802.11a and 802.11n receivers. This control data may be contained in the L-SIG 360. The data in the L-SIG 360 informs all receivers how long the transmission will occupy the wireless medium, so that all devices may defer their transmissions for an accurate amount of time. Additionally, the 802.11ac preamble 364 may allow 802.11ac devices to distinguish the transmission as an 802.11ac transmission (and avoid determining that the transmission is in an 802.11a or 802.11n format, for example).

In accordance with the systems and methods disclosed herein, the six VHT-LTFs 368*a-f* may be mapped using a first matrix (e.g., P matrix) 110 with at least one column multiplied by −1. For example, when five or six streams 130 are used for transmitting VHT-LTFs 368*a-f*, then six VHT-LTFs 368*a-f* may be used in the frame (e.g., packet) 300 as illustrated in FIG. 3. The transmitting communication device 102 may apply the P matrix 110 to the data or sequences in the VHT-LTFs 368*a-f*. More specifically, a transmitting communication device 102 may multiply the VHT-LTF data (e.g., sequence) in the first VHT-LTF 368*a* on a first stream 130 by the first element of the first row of the P matrix 110. Additionally, the transmitting communication device 102 may respectively multiply the data or sequences in each of the second through sixth VHT-LTFs 368*b-f* on the first stream 130 by the second through sixth elements of the first row of the P matrix 110. Additionally, the transmitting communication device 102 may respectively multiply the data or sequences in six VHT-LTFs 368*a-f* on a second through fifth or sixth stream 130 by respective rows of the P matrix 110. It should be noted that in a case where five streams 130 are used, the sixth row of the P matrix 110 may not be used. For example, when applying the first matrix (e.g., P matrix) 110 in a five stream 130 case, the sixth row of the first matrix (e.g., P matrix) 110 may not be multiplied with any data or sequence. The transmitting communication device 102 may similarly apply a second matrix (e.g., R matrix) 112 to pilots (e.g., pilot sequences) included in each VHT-LTF 368*a-f* on five or six streams 130.

Figure 4:
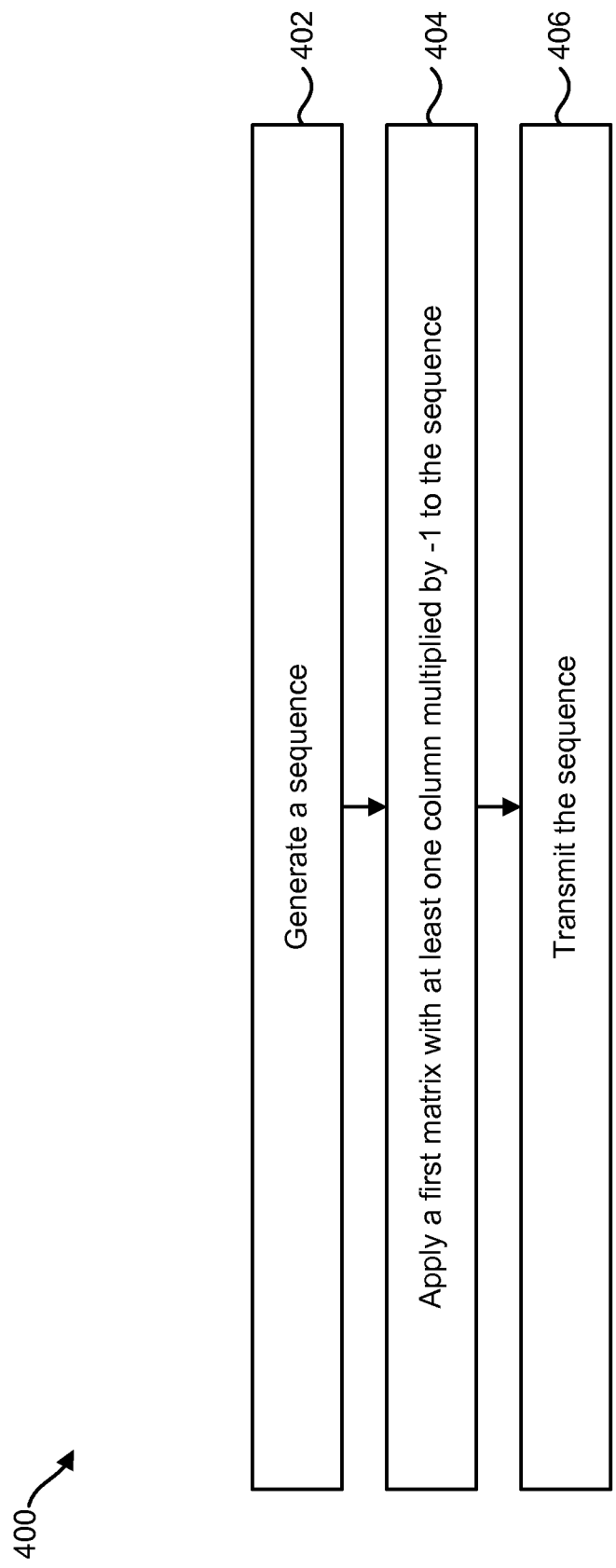
FIG. 4 is a flow diagram illustrating one configuration of a method for generating a matrix-mapped sequence.

FIG. 4 is a flow diagram illustrating one configuration of a method 400 for generating a matrix-mapped sequence. A transmitting communication device 102 may generate 402 a sequence. For example, the transmitting communication device 102 may generate 402 one or more training sequences for each VHT-LTF (e.g., VHT-LTF data) to be transmitted in a frame. A training sequence (e.g., VHT-LTF data) may comprise a series of values, symbols or tones that may be used to estimate a channel (e.g., a multiple input and multiple output (MIMO) channel).

The transmitting communication device 102 may apply 404 a first matrix (e.g., P matrix) 110 with at least one column multiplied by −1 to the sequence. For instance, the transmitting communication device 102 may multiply the sequence (e.g., VHT-LTF sequence, VHT-LTF data, training sequence, etc.) in each VHT-LTF by a corresponding element of the P matrix 110. As described above, the P matrix 110 may be a DFT matrix as illustrated in Equation (3) that has had one or more of its columns multiplied by −1. In one configuration, the transmitting communication device 102 may apply 404 the P matrix 110 to the sequence by multiplying the sequence in each VHT-LTF by a corresponding element of the P matrix 110 illustrated in Equation (1). Alternatively, the P matrix 110 illustrated in Equation (2) may be used. In one configuration, the transmitting communication device 102 may multiply sequences in six VHT-LTFs on five or six streams 130 by corresponding elements of the P matrix 110.

The transmitting communication device 102 may transmit 406 the sequence. For example, the transmitting communication device 102 may transmit 406 the sequence that has had the first matrix (e.g., P matrix) 110 applied to it. For instance, the transmitting communication device 102 may transmit 406 VHT-LTF data in six VHT-LTFs on five or six streams 130 that has been multiplied by the P matrix 110.

Figure 5:
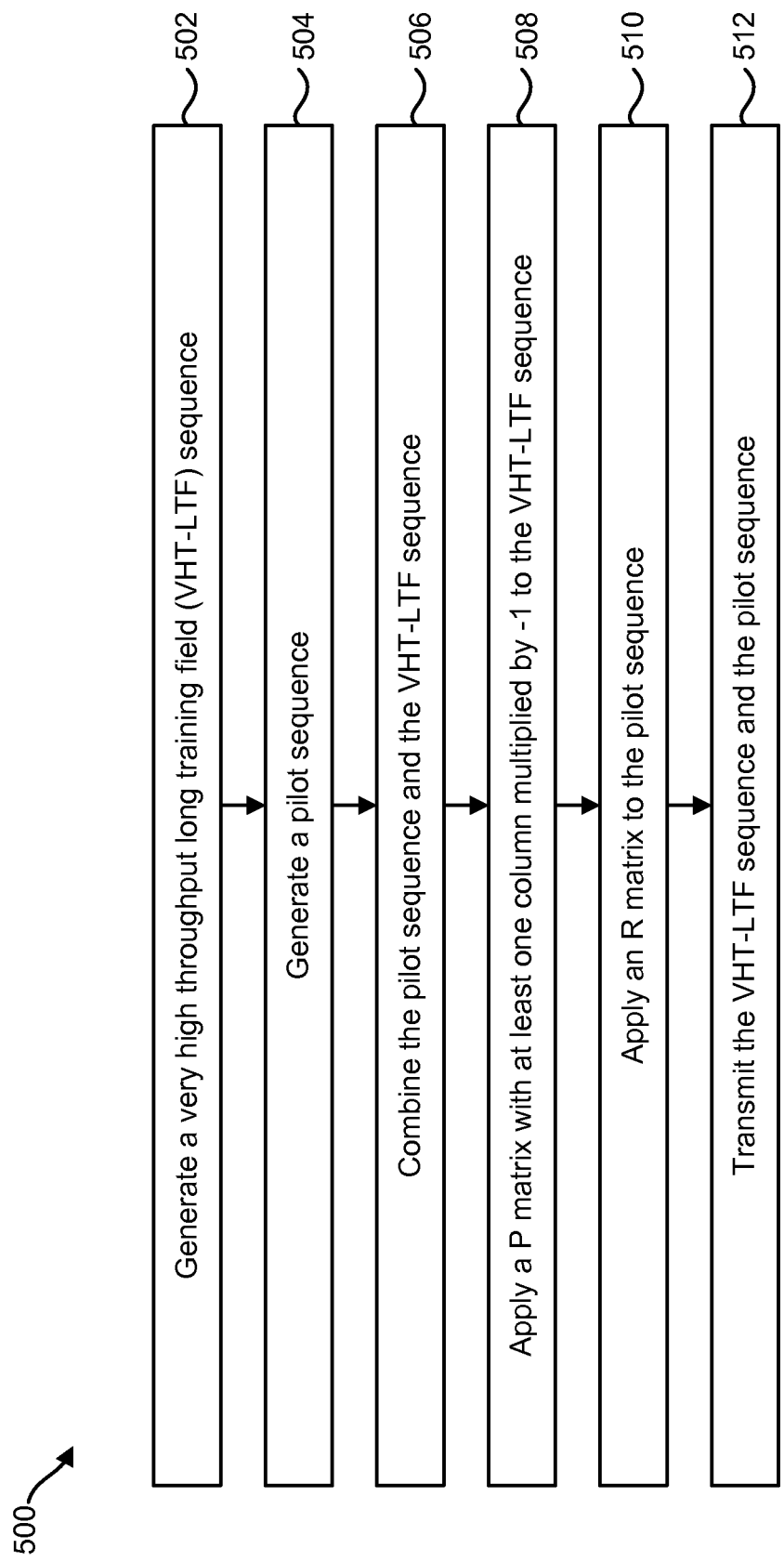
FIG. 5 is a flow diagram illustrating a more specific configuration of a method for generating a matrix-mapped sequence.

FIG. 5 is a flow diagram illustrating a more specific configuration of a method 500 for generating a matrix-mapped sequence. A transmitting communication device 102 may generate 502 a very high throughput long training field (VHT-LTF) sequence (e.g., VHT-LTF data). For example, the transmitting communication device 102 may generate 502 one or more training sequences for each VHT-LTF (e.g., VHT-LTF data) to be transmitted in a frame. A training sequence (e.g., VHT-LTF data) may comprise a series of values, symbols or tones that may be used to estimate a channel (e.g., a multiple input and multiple output (MIMO) channel).

The transmitting communication device 102 may generate 504 a pilot sequence. For example, the transmitting communication device 102 may generate 504 a pilot sequence for each VHT-LTF (e.g., VHT-LTF pilots). A pilot sequence may be a group or series of pilot values, symbols or tones that may be used to track phase and/or frequency offsets in transmitted signals.

The transmitting communication device 102 may combine 506 the pilot sequence and the VHT-LTF sequence. For example, the transmitting communication device 102 may combine 506 the pilots and VHT-LTF sequence by inserting the pilots into particular subcarriers 132 of an OFDM symbol that includes the VHT-LTF sequence.

The transmitting communication device 102 may apply 508 a P matrix 110 with at least one column multiplied by −1 to the VHT-LTF sequence. For instance, the transmitting communication device 102 may multiply the VHT-LTF sequence (e.g., VHT-LTF data) in each VHT-LTF by a corresponding element of the P matrix 110. As described above, the P matrix 110 may be a DFT matrix as illustrated in Equation (3) that has had one or more of its columns multiplied by −1. In one configuration, the transmitting communication device 102 may apply 508 the P matrix 110 to the sequence by multiplying the sequence in each VHT-LTF by a corresponding element of the P matrix 110 illustrated in Equation (1). Alternatively, the P matrix 110 illustrated in Equation (2) may be used. In one example, when five or six streams 130 are used for transmitting VHT-LTFs, then six VHT-LTFs may be used in a frame (e.g., packet). The transmitting communication device 102 may multiply the VHT-LTF data (e.g., sequence) in the first VHT-LTF on a first stream 130 by the first element of the first row of the P matrix 110. Additionally, the transmitting communication device 102 may respectively multiply the data or sequences in each of the second through sixth VHT-LTFs on the first stream 130 by the second through sixth elements of the first row of the P matrix 110. Additionally, the transmitting communication device 102 may respectively multiply the data or sequences in six VHT-LTFs on a second through fifth or sixth stream 130 by respective rows of the P matrix 110.

The transmitting communication device 102 may apply 510 an R matrix 112 to the pilot sequence. In one configuration, the R matrix 112 may be based on or correspond to a particular P matrix 110. For example, the R matrix 112 may comprise a number of replicas of the first row of the P matrix 110. The number of replicas may be a number of space-time streams 130 (e.g., $N_{STS}$). Spectral lines on the pilots may be avoided by having a P matrix 110 with a first row that includes one or more values of −1 (which may be accomplished by multiplying one or more columns by −1). The transmitting communication device 102 may apply 510 the R matrix 112 to the pilot sequence by multiplying the pilot tones (in VHT-LTFs) by the R matrix 112. For instance, the transmitting communication device 102 may multiply pilot sequences in six VHT-LTFs on five or six streams 130 by corresponding elements in the R matrix 112.

The transmitting communication device 102 may transmit 512 the VHT-LTF sequence and the pilot sequence. For example, the transmitting communication device 102 may transmit 512 the VHT-LTF sequence that has had the P matrix 110 applied to it and may transmit the VHT-LTF pilot sequence that has had the R matrix 112 applied to it. For instance, the transmitting communication device 102 may transmit 512 VHT-LTF data and pilots that have been respectively multiplied by the P matrix 110 and the R matrix 112 in six VHT-LTFs on five or six streams 130.

Figure 6:
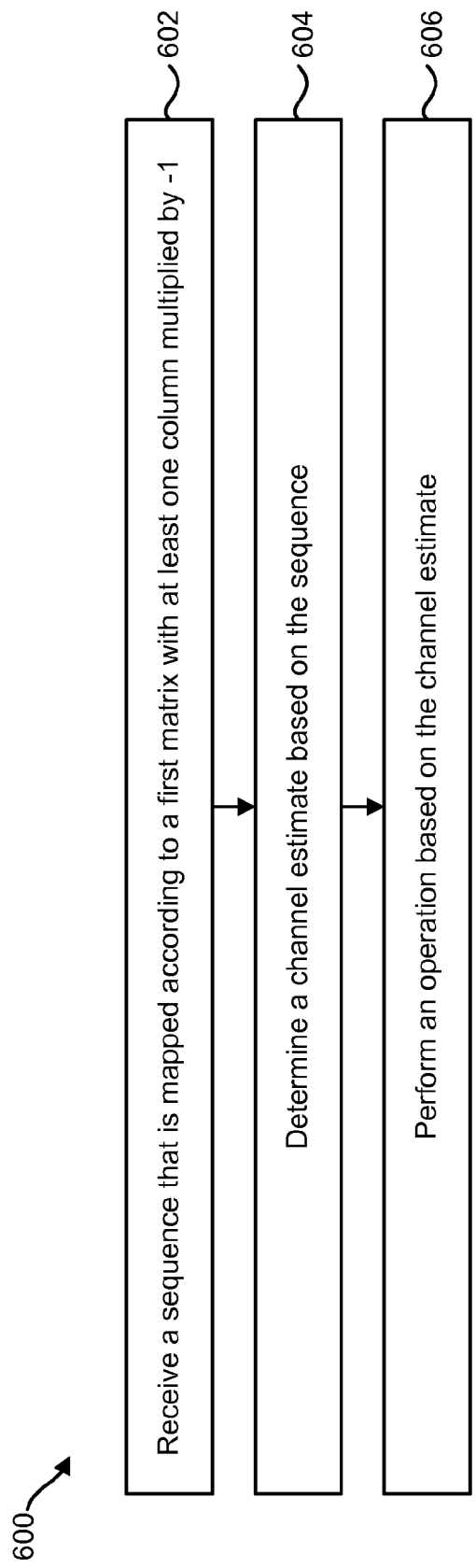
FIG. 6 is a flow diagram illustrating another configuration of a method for using a matrix-mapped sequence.

FIG. 6 is a flow diagram illustrating another configuration of a method 600 for using a matrix-mapped sequence. A receiving communication device 134 may receive 602 a sequence that is mapped according to a first matrix with at least one column multiplied by −1. For example, the receiving communication device 134 may receive one or more VHT-LTFs from the transmitting communication device 102 that include one or more sequences that have been mapped using a first matrix (e.g., P matrix) 110 with at least one column multiplied by −1. For instance, the receiving communication devices may receive 602 six sequences (e.g., VHT-LTFs) that have been mapped using a first matrix (e.g., P matrix) 110 with at least one column multiplied by −1. As described above, the first matrix (e.g., P matrix) 110 may be the DFT matrix illustrated in Equation (3) that has had one or more columns multiplied by −1.

The receiving communication device 134 may additionally receive pilots that are mapped according to a second matrix (e.g., R matrix) 112. In one configuration, the R matrix 112 is based on or corresponds to the P matrix 110, where the R matrix 112 comprises a number of replicas of the first row of the P matrix 110. In one example, the receiving communication device 134 may receive pilots that have been mapped according to the R matrix 112 in six VHT-LTFs on five or six streams 130. The pilots may be used to track (and/or compensate for) frequency and phase offsets in the received signal.

The receiving communication device 134 may determine 604 a channel estimate based on the sequence. For example, the matrix-mapped sequence in one or more VHT-LTFs may be used to estimate a MIMO channel used to transmit the VHT-LTFs from the transmitting communication device 102 to the receiving communication device 134.

The receiving communication device 134 may perform 606 an operation based on the channel estimate. For example, the receiving communication device 134 may use the channel estimate to demodulate and/or decode data (e.g., VHT-DATA) received from the transmitting communication device 102. In one configuration, the receiving communication device 134 may additionally or alternatively send (e.g., transmit) the channel estimate to the transmitting communication device 102. The transmitting communication device 102 may then use the channel estimate for precoding, beamforming, etc., for example.

Figure 7:
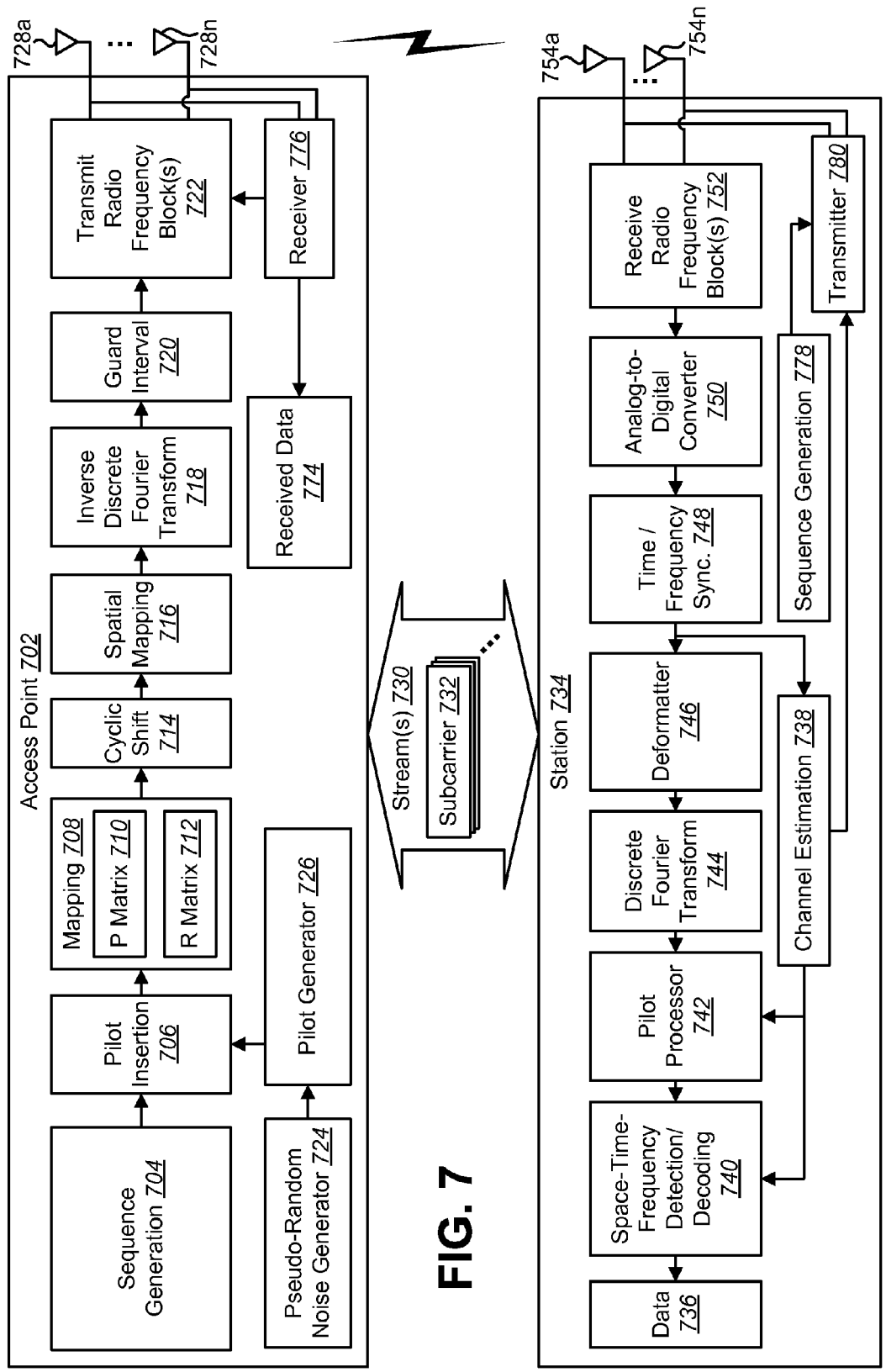
FIG. 7 is a block diagram illustrating one configuration of an access point (AP) and a station (STA) in which systems and methods for using a matrix-mapped sequence may be implemented.

FIG. 7 is a block diagram illustrating one configuration of an access point (AP) 702 and a station (STA) 734 in which systems and methods for using a matrix-mapped sequence may be implemented. The access point 702 may include a sequence generation block/module 704, a pilot insertion block/module 706, a mapping block/module 708, a cyclic shift block/module 714, a spatial mapping block/module 716, an Inverse Discrete Fourier Transform (IDFT) block/module 718, a guard interval block/module 720, one or more transmit radio frequency blocks 722, one or more antennas 728a-n, a pseudo-random noise generator 724, a pilot generator 726 and/or a receiver 776.

It should be noted that one or more of the elements 704, 706, 708, 714, 716, 718, 720, 722, 724, 726, 776 included in the access point 702 may be implemented in hardware, software or a combination of both. Furthermore, the term "block/module" may be used to indicate that a particular element may be implemented in hardware, software or a combination of both. It should also be noted that although some of the elements 704, 706, 708, 714, 716, 718, 720, 722, 724, 726, 776 may be illustrated as a single block, one or more of the elements 704, 706, 708, 714, 716, 718, 720, 722, 724, 726, 776 illustrated may comprise multiple parallel blocks/modules in some configurations. For instance, multiple sequence generation blocks/modules 704, multiple pilot insertion blocks/modules 706, multiple mapping blocks/modules 708, multiple cyclic shift blocks/modules 714, multiple spatial mapping blocks/modules 716, multiple inverse discrete Fourier transform blocks/modules 718, multiple guard interval blocks/modules 720 and/or multiple transmit radio frequency block(s) 722 may be used to form multiple paths in some configurations.

For instance, separate streams 730 (e.g., space-time streams 730, spatial streams 730, etc.) may be generated and/or transmitted using separate paths. In some implementations, these paths are implemented with distinct hardware, whereas in other implementations, the path hardware is reused for more than one stream 730 or the path logic is implemented in software that executes for one or more streams 730. More specifically, each of the elements illustrated in the access point 702 may be implemented as a single block/module or as multiple blocks/modules.

The sequence generation block/module 704 may generate one or more training sequences (e.g., "VHT-LTF data" or "VHT-LTF sequences"). For example, the sequence generation block/module 704 may generate one or more training sequences for each VHT-LTF to be transmitted in a frame. In some configurations, the sequence generation block/module 704 may generate a sequence in the frequency domain based on an amount of transmission bandwidth. For example, different sequences may be generated based on whether 20 megahertz (MHz), 40 MHz, 80 MHz or 160 MHz of bandwidth is allocated for transmission. The sequence(s) may be provided to the pilot insertion block/module 706.

The pilot generator 726 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The access point 702 may include a pseudo-random noise generator 724 in some configurations. The pseudo-random noise generator 724 may generate a pseudo-random noise sequence or signal (e.g., values) used to scramble the pilot sequence. For example, the pilot sequence for successive orthogonal frequency-division multiplexing (OFDM) symbols may be multiplied by successive numbers from the pseudo-random noise sequence, thereby scrambling the pilot sequence per OFDM symbol.

The pilot insertion block/module 706 inserts pilot tones into pilot tone subcarriers 732. For example, the pilot sequence may be mapped to subcarriers 732 at particular indices. For instance, pilot symbols from the (scrambled) pilot sequence may be mapped to pilot subcarriers 732 that are interspersed with data subcarriers 732 and/or other subcarriers 732. In other words, the pilot sequence or signal may be combined with the data sequence or signal. In some configurations, one or more direct current (DC) tones may be centered at a subcarrier index 0. The pilot insertion block/module 706 may apply phase rotation to the combined signal (e.g., to one or more 20 MHz subbands) in some configurations.

The combined data and pilot signal may be provided to the mapping block/module 708. The mapping block/module 708 may apply matrix mapping to the data tones (e.g., a training sequence) and/or to the pilot tones (e.g., pilot sequence) included in the combined signal to produce a matrix-mapped signal. The mapping block/module 708 may include a P matrix 710 and/or an R matrix 712.

In one example, the P matrix 710 provides a mapping for the data tones (e.g., training sequence) in one or more very high throughput long training fields (VHT-LTFs). The P matrix 710 may have at least one of its 710 columns multiplied by −1. For example, the first matrix 710 may be a DFT matrix $P_{original}$ that has had one or more of its columns multiplied by −1, where $P_{original}$ is given in Equation (3) above. One specific example of the P matrix 710 is given above in Equation (1). The example given in Equation (1) may be used because the first row of $P_{6 \times 6}$ in Equation (1) may be equal to the first row of a four-by-four P matrix {1,−1,1,1}, with the first two values repeated at the end. It should be noted that multiplying any column by −1 does not change the orthogonality of the P matrix 710. Another specific example of the P matrix 710 is given above in Equation (2).

The data tones (e.g., training sequence, VHT-LTF sequence) in the combined signal may be multiplied by elements of the P matrix 710. For example, each column of the P matrix 710 may correspond to a VHT-LTF and each row of the P matrix 710 may correspond to a stream 730. Thus, the example of the P matrix 710 given in Equation (1) may be applied to six VHT-LTFs on six streams 730 (e.g., spatial streams 730 or space-time streams 730). More specifically, for instance, data tones in a first VHT-LTF on a first stream 730 may be multiplied by the element in the first column and first row of the P matrix 710. Furthermore, data tones in a second VHT-LTF on a first stream may be multiplied by the second element in the first row of the P matrix 710 and so on.

It should be noted that a six-by-six P matrix 710 may be applied when five or six streams 730 (e.g., spatial streams 730, space-time streams 730) are used for transmitting data tones (e.g., one or more training sequences) in some configurations. Other P matrices may be used for different numbers of streams 730, for instance.

In one configuration, the R matrix 712 provides a mapping for the pilot tones in one or more VHT-LTFs. For example, the pilot tones in one or more VHT-LTFs on one or more streams 730 (e.g., spatial streams 730 or space-time streams 730) may be multiplied by the R matrix 712.

The R matrix 712 may include a number of replicas of the first row of the P matrix 710. In one configuration, the R matrix 712 includes $N_{STS}$ replicas of the first row of the P matrix 710, where $N_{STS}$ is a number of space-time streams 730. As described above, one problem addressed by the systems and methods disclosed herein is the formation of spectral lines on the pilots. This may occur if the first row of a P matrix 710 is all ones in the case of six VHT-LTFs. However, in accordance with the systems and methods disclosed herein, one or more of the columns of the P matrix 710 may be multiplied by −1, thus avoiding a first row of all ones in the P matrix 710.

The output of the mapping block/module 708 (e.g., a matrix-mapped signal) may be provided to the cyclic shift block/module 714. The cyclic shift block/module 714 may insert cyclic shifts to one or more streams 730 (e.g., spatial streams 730 or space-time streams 730) for cyclic shift diversity (CSD). In one configuration, cyclic shifts may be applied to multiple transmit chains.

The output of the cyclic shift block/module 714 may be provided to a spatial mapping block/module 716. The spatial mapping block/module 716 may map output of the cyclic shift block/module 714 (e.g., data tones and/or pilot tones) to one or more streams 730 (e.g., spatial streams 730 or space-time streams 730).

The IDFT block/module 718 may perform an inverse discrete Fourier transform on the signal provided by the spatial mapping block/module 716. For example, the inverse discrete Fourier transform (IDFT) block/module 718 converts the frequency signals of the data tones and/or pilot tones into time domain signals representing the signal over the streams 730 and/or time-domain samples for a symbol period. In one configuration, for example, the IDFT block/module 718 may perform an inverse fast Fourier transform (IFFT).

The signal output from the IDFT block/module 718 may be provided to the guard interval block/module 720. The guard interval block/module 720 may insert (e.g., prepend) a guard interval to the signal output from the IDFT block/module 718. For example, the guard interval block/module 720 may insert an 800 nanosecond (ns) guard interval. In some configurations, the guard interval block/module 720 may additionally perform windowing on the signal.

The output of the guard interval block/module 720 may be provided to the transmit radio frequency block(s) 722. The transmit radio frequency block(s) 722 may upconvert the output of the guard interval block/module 720 (e.g., a complex baseband waveform) and transmit the resulting signal using the one or more antennas 728*a-n*. For example, the one or more transmit radio frequency block(s) 722 may output radio-frequency (RF) signals to one or more antennas 728*a-n*, thereby transmitting the data tones (e.g., VHT-LTF sequence) and/or pilot tones (e.g., VHT-LTF pilots) over a wireless medium suitably configured for receipt by one or more stations 734.

It should be noted that the access point 702 may determine channel bandwidth to be used for transmissions to one or more stations 734. This determination may be based on one or more factors, such as station 734 compatibility, number of stations 734 (to use the communication channel), channel quality (e.g., channel noise) and/or a received indicator, etc. In one configuration, the access point 702 may determine whether the bandwidth for signal transmission is 20 MHz, 40 MHz, 80 MHz or 160 MHz.

One or more of the elements 704, 706, 708, 714, 716, 718, 720, 722, 724, 726, 776 included in the access point 702 may operate based on the bandwidth determination. For example, the sequence generation block/module 704 may generate one or more particular training sequences (e.g., VHT-LTF data tones) based on transmission bandwidth. Additionally or alternatively, the pilot generator 726 may generate a number of pilot symbols based on the bandwidth for signal transmission. For example, the pilot generator 726 may generate a certain number of pilot symbols for an 80 MHz signal. It should be noted that the tones or subcarriers 732 may be orthogonal frequency-division multiplexing (OFDM) subcarriers 732 in some configurations.

Additionally, the pilot insertion block/module 706 may insert pilot tones based on a bandwidth for signal transmission. For instance, the pilot insertion block/module 706 may insert pilot symbols into pilot tones (e.g., pilot subcarriers 732) based on a bandwidth for signal transmission.

Additionally, the mapping block/module 708 may matrix map the data tones and/or pilot tones based on the bandwidth for signal transmission. For instance, the mapping block/module 708 may matrix map a number of data tones (e.g., data subcarriers 732) and a number of pilot tones (e.g., pilot subcarriers 732) based on a bandwidth for signal transmission.

One or more streams 730 may be transmitted from the access point 702 such that the transmissions on different streams 730 may be differentiable at a station 734 (with some probability). For example, bits mapped to one spatial dimension are transmitted as one stream 730. That stream 730 might be transmitted on its own antenna 728 spatially separate from other antennas 728, its own orthogonal superposition over a plurality of spatially-separated antennas 728, its own polarization, etc. Many techniques for stream 730 separation (involving separating antennas 728 in space or other techniques that would allow their signals to be distinguished at a receiver, for example) are known and can be used. In the example shown in FIG. 7, there are one or more streams 730 that are transmitted using the same or a different number of antennas 728a-n (e.g., one or more).

In the case that the access point 702 uses a plurality of frequency subcarriers 732, there are multiple values for the frequency dimension, such that some data (e.g., some VHT-LTF data) may be mapped to one frequency subcarrier 732 and other data (e.g., other VHT-LTF data) to another frequency subcarrier 732. Other frequency subcarriers 732 may be reserved as guard bands, pilot tone subcarriers 732, or the like that do not (or do not always) carry data. For example, there may be one or more data subcarriers 732 and one or more pilot subcarriers 732. It should be noted that, in some instances or configurations, not all subcarriers 732 may be excited at once. For instance, some tones may not be excited to enable filtering. In one configuration, the access point 702 may utilize orthogonal frequency-division multiplexing (OFDM) for the transmission of multiple subcarriers 732.

The time dimension refers to symbol periods. Different bits may be allocated to different symbol periods. Where there are multiple streams 730, multiple subcarriers 732 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of streams 730 times the number of data subcarriers 732, divided by the length of the symbol period.

One or more stations 734 may receive and use signals from the access point 702. For example, a station 734 may use a received bandwidth indicator to receive a given number of OFDM tones or subcarriers 732. In one configuration, a station 734 may use a VHT-LTF sequence generated by and received from the access point 702 to estimate the channel. It should be noted that one or more of the elements included in the station (STA) 734 may be implemented in software, hardware or a combination of both.

A station 734 may include one or more antennas 754a-n (which may be greater than, less than or equal to the number of access point 702 antennas 728a-n and/or the number of streams 730) that feed to one or more receive radio frequency blocks 752. The receive radio frequency block(s) 752 may output analog signals to one or more analog-to-digital converters (ADCs) 750. For example, a receive radio frequency block 752 may receive and downconvert a signal, which may be provided to an analog-to-digital converter 750. As with the access point 702, the number of streams 730 processed may or may not be equal to the number of antennas 754a-n. Furthermore, each stream 730 need not be limited to one antenna 754, as various beamsteering, orthogonalization, etc. techniques may be used to arrive at a plurality of receiver streams.

The one or more analog-to-digital converters (ADCs) 750 may convert the received analog signal(s) to one or more digital signal(s). The output(s) of the one or more analog-to-digital converters (ADCs) 750 may be provided to one or more time and/or frequency synchronization blocks/modules 748. A time and/or frequency synchronization block/module 748 may (attempt to) synchronize or align the digital signal in time and/or frequency (to a station 734 clock, for example).

The (synchronized) output of the time and/or frequency synchronization block(s)/module(s) 748 may be provided to one or more deformatters 746. For example, a deformatter 746 may receive an output of the time and/or frequency synchronization block(s)/module(s) 748, remove guard intervals, etc. and/or parallelize the data for discrete Fourier transform (DFT) processing.

One or more deformatter 746 outputs may be provided to one or more discrete Fourier transform (DFT) blocks/modules 744. The discrete Fourier transform (DFT) blocks/modules 744 may convert one or more signals from the time domain to the frequency domain. A pilot processor 742 may use the frequency domain signals (per stream 730, for example) to determine one or more pilot tones (over the streams 730, frequency subcarriers 732 and/or groups of symbol periods, for example) sent by the access point 702. The pilot processor 742 may additionally or alternatively de-scramble the pilot sequence. The pilot processor 742 may use one or more pilot sequences described herein for phase, frequency and/or amplitude tracking. The pilot tone(s) may be provided to a space-time-frequency detection and/or decoding block/module 740, which may detect and/or decode the data over the various dimensions. The space-time-frequency detection and/or decoding block/module 740 may output received data 736 (e.g., the station's 734 estimation of data transmitted by the access point 702).

In some configurations, the station 734 knows the sequences (e.g., VHT-LTF data, training sequences, etc.) sent as part of a total information sequence. The station 734 may perform channel estimation with the aid of these known sequences. To assist with pilot tone tracking, processing and/or data detection and decoding, a channel estimation block/module 738 may provide estimation signals (e.g., channel estimates) to the pilot processor 742, to the space-time-frequency detection and/or decoding block/module 740 and/or to the transmitter 780 (e.g., transmitter circuitry) based on the output from the time and/or frequency synchronization block/module 748. Alternatively, if the de-formatting and discrete Fourier transform is the same for the known transmit sequences as for the payload data portion of the total information sequence, the estimation signals may be provided to the pilot processor 742, to the space-time-frequency detection and/or decoding block/module 740 and/or to the transmitter 780 based on the output from the discrete Fourier transform (DFT) blocks/modules 744.

In accordance with the systems and methods disclosed herein, the station 734 may receive a sequence (e.g., VHT-LTF data) that is mapped according to a matrix with a least one column multiplied by −1. For example, the station 734 may receive a VHT-LTF sequence or VHT-LTF data (e.g., training sequence) that has been mapped using the P matrix 710 that has at least one of its columns multiplied by −1. For instance, the DFT matrix illustrated in Equation (3) with one or more of its columns multiplied by −1 may be used to map the VHT-LTF data or sequence that is received by the station 734.

The station 734 (e.g., channel estimation block/module 738) may use the received data or sequence to generate a channel estimate. The station 734 may use the channel estimate to improve communications between the access point 702 and the station 734. For example, the station 734 may use the channel estimate to better receive (e.g., demodulate, decode, etc.) data sent from the access point 702. Additionally or alternatively, the station 734 may send the channel estimate (as feedback) to the access point 702 for use in precoding, beamsteering, etc. In some configurations, for instance, the station 734 may include a transmitter 780 for transmitting the channel estimate to the access point 702. Accordingly, the access point 702 may also include a receiver 776 for receiving signals (such as the channel estimate) from the station 734 in some configurations. Received pilot tones in the VHT-LTF may be used to track frequency and phase offset in received transmissions.

In some configurations, the station 734 may determine a channel bandwidth (for received communications). For example, the station 734 may receive a bandwidth indication from the access point 702 that indicates a channel bandwidth. For instance, the station 734 may obtain an explicit or implicit bandwidth indication. In one configuration, the bandwidth indication may indicate a channel bandwidth of 20 MHz, 40 MHz, 80 MHz or 160 MHz. The station 734 may determine the bandwidth for received communications based on this indication and provide an indication of the determined bandwidth to the pilot processor 742 and/or to the space-time-frequency detection/decoding block/module 740.

In the configuration illustrated in FIG. 7, the station 734 may include a transmitter 780. The transmitter 780 may perform similar operations as those performed by one or more of the elements 706, 708, 714, 716, 718, 720, 722, 724, 726 included in the access point 702 in order to transmit a sequence (that has been mapped using a matrix with at least one column multiplied by −1) provided by a sequence generation block/module 778.

In the configuration illustrated in FIG. 7, the access point 702 may include a receiver 776. The receiver 776 may perform similar operations as those performed by one or more of the elements 740, 742, 744, 746, 748, 750, 752, 738 included in the station 734 in order to receive a sequence (that has been mapped using a matrix with at least one column multiplied by −1) from one or more stations 734. For example, the receiver 776 may perform one or more functions in order to provide received data 774 and/or to provide a channel estimate to the transmit radio frequency block(s) 722. Thus, as illustrated in FIG. 7, bi-directional communications between the access point 702 and the station 734 may occur on one or more streams 730 and on one or more subcarriers 732. In one configuration, this may allow bi-directional channel estimate feedback between the access point 702 and the station 734.

Figure 8:
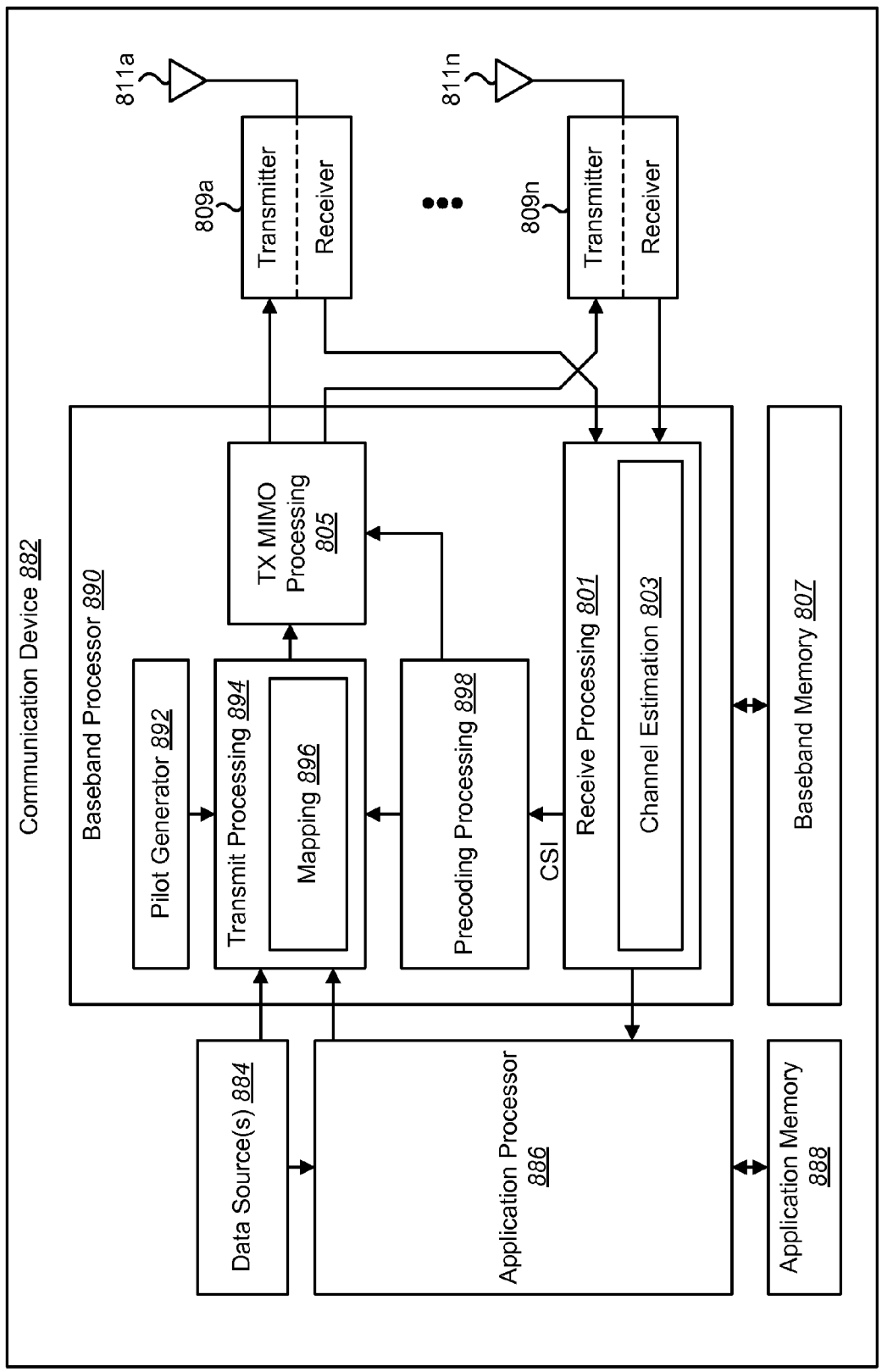
FIG. 8 is a block diagram of a communication device that may be used in a multiple-input and multiple-output (MIMO) system.

FIG. 8 is a block diagram of a communication device 882 that may be used in a multiple-input and multiple-output (MIMO) system. Examples of the communication device 882 may include transmitting communication devices 102, receiving communication devices 134, access points (APs) 702, stations (STAs) 734, base stations, user equipments (UEs), etc. In the communication device 882, data for a number of data streams is provided from one or more data sources 884 and/or an application processor 886 to a baseband processor 890. In particular, data may be provided to a transmit processing block/module 894 included in the baseband processor 890. Each data stream may then be transmitted over a respective transmit antenna 811a-n. The transmit processing block/module 894 may format, code and/or interleave the data for each data stream based on a particular coding scheme selected for that data stream to provide coded data.

The transmit processing block/module 894 may perform one or more of the methods 400, 500 illustrated in FIGS. 4 and 5. For example, the transmit processing block/module 894 may include a mapping block/module 896. The mapping block/module 896 may execute instructions in order to map data (e.g., a VHT-LTF sequence) and/or pilots (e.g., VHT-LTF pilots) as described above.

The coded data for each data stream may be multiplexed with pilot data from a pilot generator 892 using orthogonal frequency-division multiplexing (OFDM) techniques. The pilot data may be a known data pattern that is processed in a known manner and used at a receiver to track phase and/or frequency offsets. The multiplexed pilot and coded data for each stream may then be modulated (i.e., symbol mapped) based on a particular modulation scheme (e.g., binary phase shift keying (BPSK), quadrature phase shift keying (QPSK), multiple phase shift keying (M-PSK), quadrature amplitude modulation (QAM) or multi-level quadrature amplitude modulation (M-QAM)) selected for that data stream to provide modulation symbols. The data rate, coding and modulation for each data stream may be determined by instructions performed by a processor (e.g., baseband processor 890, application processor 886, etc.).

The modulation symbols for all data streams may be provided to a transmit (TX) multiple-input multiple-output (MIMO) processing block/module 805, which may further process the modulation symbols (for OFDM, for example). The transmit (TX) multiple-input multiple-output (MIMO) processing block/module 805 then provides a number of modulation symbol streams to the transmitters 809a-n. The transmit (TX) multiple-input multiple-output (MIMO) processing block/module 805 may apply beamforming weights to the symbols of the data streams and to the antenna 811 from which the symbol is being transmitted.

Each transmitter 809a-n may receive and process a respective symbol stream to provide one or more analog signals, and further condition (e.g., amplify, filter, and upconvert) the analog signals to provide a modulated signal suitable for transmission over the MIMO channel. Modulated signals from the transmitters 809a-n are then respectively transmitted from the antennas 811*a-n*. For example, the modulated signal may be transmitted to another communication device (not illustrated in FIG. 8).

The communication device 882 may receive modulated signals (from another communication device). These modulated signals are received by antennas 811 and conditioned by receivers 809 (e.g., filtered, amplified, downconverted, digitized). In other words, each receiver 809*a-n* may condition (e.g., filter, amplify, and downconvert) a respective received signal, digitize the conditioned signal to provide samples, and further process the samples to provide a corresponding "received" symbol stream.

A receive processing block/module 801 included in the baseband processor 890 then receives and processes the received symbol streams from the receivers 809 based on a particular receiver processing technique to provide a number of "detected" streams. The receive processing block/module 801 may demodulate, deinterleave and decode each stream to recover the data for the data stream.

The receive processing block/module 801 may perform the method 600 illustrated in FIG. 6 in some configurations. For example, the receive processing block/module 801 may include a channel estimation block/module 803. The channel estimation block/module 803 may execute instructions to estimate a channel based on a received sequence that has been mapped using a matrix with at least one column multiplied by −1. Additionally or alternatively, the receive processing block/module 801 may receive a channel estimate from another device.

A precoding processing block/module 898 included in the baseband processor 890 may receive channel state information (CSI), which may include a channel estimate, from the receive processing block/module 801. The precoding processing block/module 898 then determines which pre-coding matrix to use for determining the beamforming weights and then processes the extracted message. It should be noted that the baseband processor 890 may store information on and retrieve information from baseband memory 807.

Data recovered by the baseband processor 890 may be provided to the application processor 886. The application processor 886 may store information in and retrieve information from the application memory 888.

It should be noted that the communication device 882 may include the mapping block/module 896 or the channel estimation block/module 803, but not both, in some configurations. In other configurations, the communication device 882 may include both the mapping block/module 896 and the channel estimation block/module 803.

In one configuration, the communication device 882 may include the mapping block/module 896, but not the channel estimation block/module 803. In this configuration, the mapping block/module 896 may map a sequence (e.g., VHT-LTF data or VHT-LTF sequence) using a first matrix (e.g., P matrix) with at least one column multiplied by −1. The sequence (e.g., a VHT-LTF) may then be transmitted to another device. The other device may use the sequence to generate a channel estimate, which may be transmitted back to the communication device 882. The communication device 882 (e.g., receive processing block/module 801) may extract the channel estimate (as channel state information (CSI), for example), which may be provided to the precoding processing block/module 898 for precoding signals for transmission.

In another configuration, the communication device 882 may include the channel estimation block/module 803, but not the mapping block/module 896. In this configuration, the communication device 882 may optionally send a training request to another device. The communication device 882 may receive a sequence (e.g., VHT-LTF sequence) that has been mapped using a matrix (e.g., P matrix) with at least one column multiplied by −1. The channel estimation block/module 803 may use the sequence to generate a channel estimate (e.g., channel state information (CSI)). The channel estimate may be transmitted to the other device, which may use the channel estimate for precoding signals for transmission (which signals may be received by the communication device 882).

In yet another configuration, the communication device 882 may include both the mapping block/module 896 and the channel estimation block/module 803. In this configuration, the communication device 882 may send a matrix-mapped sequence to another device, which may be used to generate a channel estimate that is fed back to the communication device 882 for improving transmissions (e.g., precoding). The communication device may additionally receive a separate matrix-mapped sequence from another device and use this sequence to generate a separate channel estimate that is fed back to the other device for use in improving transmissions (e.g., precoding).

Figure 9:
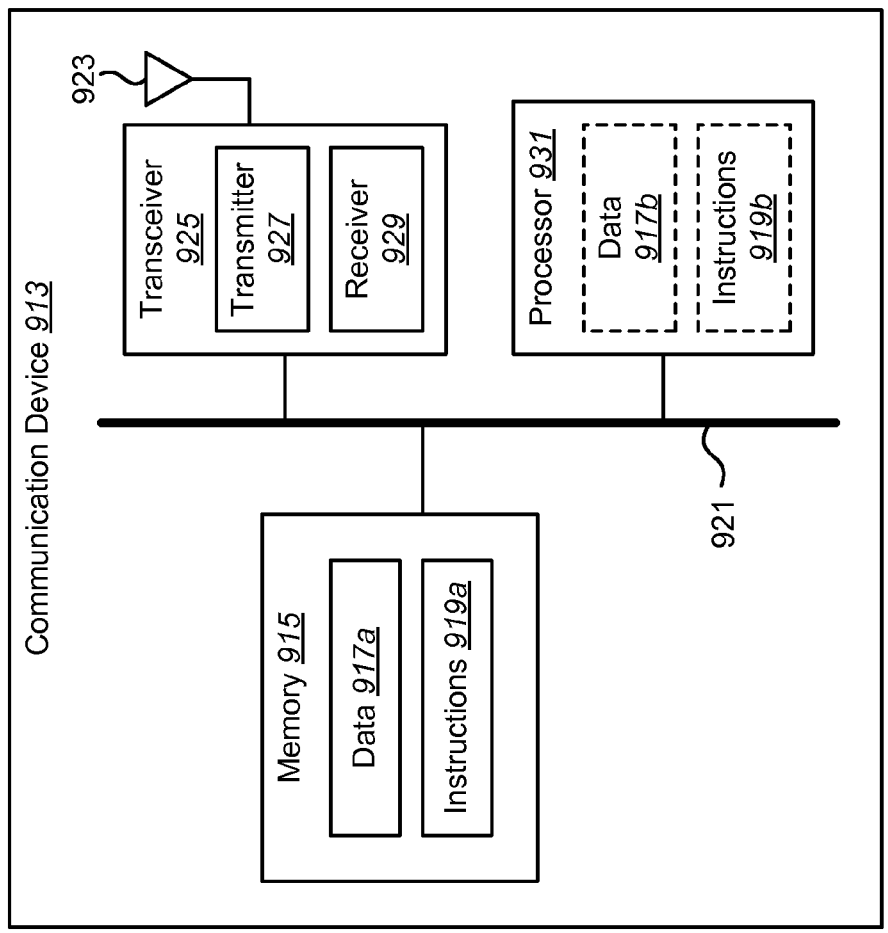
FIG. 9 illustrates certain components that may be included within a communication device.

FIG. 9 illustrates certain components that may be included within a communication device 913. The transmitting communication device 102, receiving communication device 134, access point 702, station (STA) 734 and/or communication device 882 described above may be configured similarly to the communication device 913 that is shown in FIG. 9.

The communication device 913 includes a processor 931. The processor 931 may be a general purpose single- or multi-chip microprocessor (e.g., an ARM), a special purpose microprocessor (e.g., a digital signal processor (DSP)), a microcontroller, a programmable gate array, etc. The processor 931 may be referred to as a central processing unit (CPU). Although just a single processor 931 is shown in the communication device 913 of FIG. 9, in an alternative configuration, a combination of processors (e.g., an advanced reduced instruction set computer (RISC) machine (ARM) and digital signal processor (DSP)) could be used.

The communication device 913 also includes memory 915 in electronic communication with the processor 931 (i.e., the processor 931 can read information from and/or write information to the memory 915). The memory 915 may be any electronic component capable of storing electronic information. The memory 915 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 917*a* and instructions 919*a* may be stored in the memory 915. The instructions 919*a* may include one or more programs, routines, sub-routines, functions, procedures, code, etc. The instructions 919*a* may include a single computer-readable (e.g., processor-readable) statement or many computer-readable statements. The instructions 919*a* may be executable by the processor 931 to implement one or more of the methods 400, 500, 600 described above. Executing the instructions 919*a* may involve the use of the data 917*a* that is stored in the memory 915. FIG. 9 shows some instructions 919*b* and data 917*b* being loaded into the processor 931 (which may come from instructions 919*a* and data 917*a* in memory 915).

The communication device 913 may also include a transmitter 927 and a receiver 929 to allow transmission and reception of signals between the communication device 913 and a remote location (e.g., another communication device, access terminal, access point, etc.). The transmitter 927 and receiver 929 may be collectively referred to as a transceiver 925. An antenna 923 may be electrically coupled to the transceiver 925. The communication device 913 may also include (not shown) multiple transmitters, multiple receivers, multiple transceivers and/or multiple antenna.

The various components of the communication device 913 may be coupled together by one or more buses, which may include a power bus, a control signal bus, a status signal bus, a data bus, etc. For simplicity, the various buses are illustrated in FIG. 9 as a bus system 921.

Figure 10:
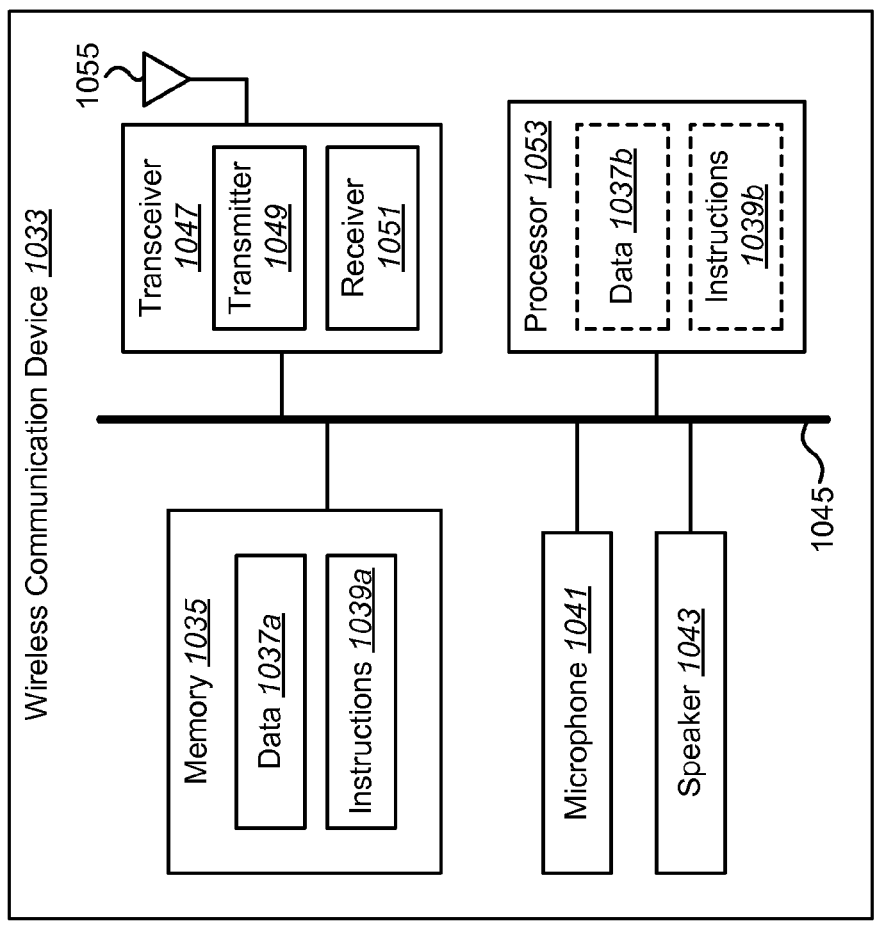
FIG. 10 illustrates certain components that may be included within a wireless communication device.

FIG. 10 illustrates certain components that may be included within a wireless communication device 1033. One or more of the transmitting communication device 102, receiving communication device 134, station (STA) 734 and communication device 882 described above may be configured similarly to the wireless communication device 1033 that is shown in FIG. 10.

The wireless communication device 1033 includes a processor 1053. The processor 1053 may be a general purpose single- or multi-chip microprocessor (e.g., an ARM), a special purpose microprocessor (e.g., a digital signal processor (DSP)), a microcontroller, a programmable gate array, etc. The processor 1053 may be referred to as a central processing unit (CPU). Although just a single processor 1053 is shown in the wireless communication device 1033 of FIG. 10, in an alternative configuration, a combination of processors 1053 (e.g., an advanced reduced instruction set computer (RISC) machine (ARM) and digital signal processor (DSP)) could be used.

The wireless communication device 1033 also includes memory 1035 in electronic communication with the processor 1053 (i.e., the processor 1053 can read information from and/or write information to the memory 1035). The memory 1035 may be any electronic component capable of storing electronic information. The memory 1035 may be random access memory (RAM), read-only memory (ROM), magnetic disk storage media, optical storage media, flash memory devices in RAM, on-board memory included with the processor 1053, programmable read-only memory (PROM), erasable programmable read-only memory (EPROM), electrically erasable PROM (EEPROM), registers, and so forth, including combinations thereof.

Data 1037a and instructions 1039a may be stored in the memory 1035. The instructions 1039a may include one or more programs, routines, sub-routines, functions, procedures, code, etc. The instructions 1039a may include a single computer-readable (e.g., processor-readable) statement or many computer-readable statements. The instructions 1039a may be executable by the processor 1053 to implement one or more of the methods 400, 500, 600 described above. Executing the instructions 1039a may involve the use of the data 1037a that is stored in the memory 1035. FIG. 10 shows some instructions 1039b and data 1037b being loaded into the processor 1053 (which may come from instructions 1039a and data 1037a in memory 1035).

The wireless communication device 1033 may also include a transmitter 1049 and a receiver 1051 to allow transmission and reception of signals between the wireless communication device 1033 and a remote location (e.g., another electronic device, communication device, etc.). The transmitter 1049 and receiver 1051 may be collectively referred to as a transceiver 1047. An antenna 1055 may be electrically coupled to the transceiver 1047. The wireless communication device 1033 may also include (not shown) multiple transmitters 1049, multiple receivers 1051, multiple transceivers 1047 and/or multiple antenna 1055.

In some configurations, the wireless communication device 1033 may include one or more microphones 1041 for capturing acoustic signals. In one configuration, a microphone 1041 may be a transducer that converts acoustic signals (e.g., voice, speech) into electrical or electronic signals. Additionally or alternatively, the wireless communication device 1033 may include one or more speakers 1043. In one configuration, a speaker 1043 may be a transducer that converts electrical or electronic signals into acoustic signals.

The various components of the wireless communication device 1033 may be coupled together by one or more buses, which may include a power bus, a control signal bus, a status signal bus, a data bus, etc. For simplicity, the various buses are illustrated in FIG. 10 as a bus system 1045.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device for generating a matrix-mapped sequence, comprising:
mapping circuitry applying a first matrix to a sequence, wherein the first matrix is given according to an equation $$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times6}$ is the first matrix and $$w = \exp\left(\frac{-j2\pi}{6}\right);$$

and
a transmit block coupled to the mapping circuitry for transmitting the sequence.

2. The communication device of claim 1, wherein the first matrix is a discrete Fourier transform (DFT) matrix.

3. The communication device of claim 1, wherein the sequence is a Very High Throughput Long Training Field (VHT-LTF) sequence.

4. The communication device of claim 1, wherein the first matrix is applied to six sequences on five or six streams.

5. The communication device of claim 1, wherein the mapping circuitry applies a second matrix to a pilot sequence, wherein the second matrix comprises a number of replicas of a first row of the first matrix.

6. The communication device of claim 1, wherein the communication device is an access point.

7. The communication device of claim 1, wherein the communication device is a station.

8. A communication device for using a matrix-mapped sequence, comprising: a receive block; wherein the receive block receives a sequence that is mapped according to a first matrix, wherein the first matrix is given according to an equation $$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times6}$ is the first matrix and $$w = \exp\left(\frac{-j2\pi}{6}\right);$$

channel estimation circuitry coupled to the receive block and configured only to receive a first signal that corresponds to the sequence, to estimate a channel from the first signal, and to produce a second signal that includes information about the estimate of the channel.

9. The communication device of claim 8, wherein the first matrix is a discrete Fourier transform (DFT) matrix.

10. The communication device of claim 8, wherein the sequence is a Very High Throughput Long Training Field (VHT-LTF) sequence.

11. The communication device of claim 8, wherein the receive block receives six sequences that are mapped according to the first matrix with at least one column multiplied by −1.

12. The communication device of claim 8, wherein the receive block receives a pilot sequence that is mapped according to a second matrix, wherein the second matrix comprises a number of replicas of a first row of the first matrix.

13. The communication device of claim 8, wherein the communication device is an access point.

14. The communication device of claim 8, wherein the communication device is a station.

15. The communication device of claim 8, wherein the channel estimation circuitry estimates a channel based on the sequence.

16. The communication device of claim 8, further comprising transmitter circuitry coupled to the channel estimation circuitry, wherein the transmitter circuitry transmits a channel estimate based on the sequence.

17. A method for generating a matrix-mapped sequence on a communication device, comprising:
applying, via a circuit, a first matrix to a sequence, wherein the first matrix is given according to an equation $$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times 6}$ is the first matrix and $$w = \exp\left(\frac{-j2\pi}{6}\right);$$

and
- transmitting, via the circuit, the sequence.

18. The method of claim 17, wherein the first matrix is a discrete Fourier transform (DFT) matrix.

19. The method of claim 17, wherein the sequence is a Very High Throughput Long Training Field (VHT-LTF) sequence.

20. The method of claim 17, wherein the first matrix is applied to six sequences on five or six streams.

21. The method of claim 17, further comprising applying, via the circuit, a second matrix to a pilot sequence, wherein the second matrix comprises a number of replicas of a first row of the first matrix.

22. The method of claim 17, wherein the communication device is an access point.

23. The method of claim 17, wherein the communication device is a station.

24. A method for using a matrix-mapped sequence on a communication device, comprising:
- receiving, via a circuit, a sequence that is mapped according to a first matrix, wherein the first matrix is given according to an equation $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times 6}$ is the first matrix and $$w = \exp\left(\frac{-j2\pi}{6}\right);$$

and estimating, via the circuit, a channel, wherein the circuit includes circuitry configured only to receive a first signal that corresponds to the sequence, to estimate a channel from the first signal, and to produce a second signal that includes information about the estimate of the channel.

25. The method of claim 24, wherein the first matrix is a discrete Fourier transform (DFT) matrix.

26. The method of claim 24, wherein the sequence is a Very High Throughput Long Training Field (VHT-LTF) sequence.

27. The method of claim 24, wherein six sequences are received that are mapped according to the first matrix with at least one column multiplied by −1.

28. The method of claim 24, further comprising receiving, via the circuit, a pilot sequence that is mapped according to a second matrix, wherein the second matrix comprises a number of replicas of a first row of the first matrix.

29. The method of claim 24, wherein the communication device is an access point.

30. The method of claim 24, wherein the communication device is a station.

31. The method of claim 24, wherein the channel is estimated based on the sequence.

32. The method of claim 24, further comprising transmitting, via the circuit, a channel estimate based on the sequence.

33. A computer-program product for generating a matrix-mapped sequence, comprising a non-transitory tangible computer-readable medium having instructions thereon, the instructions comprising:
- code for causing the communication device to apply a first matrix to a sequence, wherein the first matrix is given according to an equation $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times 6}$ is the first matrix and $$w = \exp\left(\frac{-j2\pi}{6}\right);$$

and
- code for causing the communication device to transmit the sequence.

34. The computer-program product of claim 33, wherein the sequence is a Very High Throughput Long Training Field (VHT-LTF) sequence.

35. An apparatus for generating a matrix-mapped sequence, comprising:
- means for applying a first matrix to a sequence, wherein the first matrix is given according to an equation $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times 6}$ is the first matrix and $$w = \exp\left(\frac{-j2\pi}{6}\right);$$

and
- means for transmitting the sequence.

36. The apparatus of claim 35, wherein the sequence is a Very High Throughput Long Training Field (VHT-LTF) sequence.

37. An apparatus for using a matrix-mapped sequence, comprising: means for receiving a sequence that is mapped according to a first wherein the first matrix is given according to an equation $$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

wherein $P_{6\times 6}$ is the first matrix and $$w = \exp\left(\frac{-j2\pi}{6}\right);$$

and means for estimating a channel, wherein the means for estimating the channel includes circuitry configured only to receive a first signal that corresponds to the sequence, to estimate a channel from the first signal, and to produce a second signal that includes information about the estimate of the channel.

38. The apparatus of claim 37, wherein the sequence is a Very High Throughput Long Training Field (VHT-LTF) sequence.

* * * * *